US008650150B2

(12) United States Patent
Zhao et al.

(10) Patent No.: US 8,650,150 B2
(45) Date of Patent: Feb. 11, 2014

(54) SYSTEM AND METHOD OF RELATING DATA AND GENERATING REPORTS

(75) Inventors: Jie Zhao, Shanghai (CN); Bin Dong, Shanghai (CN); Yingyu Chen, Shanghai (CN); Xin Xu, Shanghai (CN)

(73) Assignee: SAP AG, Walldorf, DE (US)

( * ) Notice: Subject to any disclaimer, the term of this patent is extended or adjusted under 35 U.S.C. 154(b) by 35 days.

(21) Appl. No.: 13/047,573

(22) Filed: Mar. 14, 2011

(65) Prior Publication Data

US 2012/0239609 A1   Sep. 20, 2012

(51) Int. Cl.
*G06F 17/00* (2006.01)
(52) U.S. Cl.
USPC .......................... 707/600; 707/603; 707/607
(58) Field of Classification Search
USPC .......................................... 707/600, 603, 607
See application file for complete search history.

(56) References Cited

U.S. PATENT DOCUMENTS

| | | | |
|---|---|---|---|
| 6,374,263 B1 * | 4/2002 | Bunger et al. .................... 1/1 |
| 7,003,560 B1 * | 2/2006 | Mullen et al. .................. 709/223 |
| 7,236,974 B2 * | 6/2007 | Bhattacharjee et al. .............. 1/1 |
| 7,730,022 B2 * | 6/2010 | Laub et al. .................... 707/603 |
| 7,761,407 B1 * | 7/2010 | Stern ............................. 707/602 |
| 8,229,966 B2 * | 7/2012 | Nolan ........................... 707/797 |
| 2003/0149627 A1 * | 8/2003 | Brady et al. ..................... 705/14 |
| 2005/0065944 A1 * | 3/2005 | Gunther et al. ................ 707/100 |
| 2005/0283492 A1 * | 12/2005 | Schmitt ......................... 707/100 |
| 2005/0289129 A1 * | 12/2005 | Schmitt ............................ 707/3 |
| 2008/0172405 A1 * | 7/2008 | Feng et al. ..................... 707/102 |
| 2009/0240663 A1 | 9/2009 | Plattner et al. |
| 2010/0318858 A1 * | 12/2010 | Essawi et al. ................... 714/49 |
| 2011/0060769 A1 * | 3/2011 | Mohan .......................... 707/803 |

OTHER PUBLICATIONS

Datawarehousing Guide, Business Intelligence Tutorials & Tips, printed on Feb. 25, 2011.
In-Memory Database Systems—Questions and Answers, printed on Feb. 24, 2011.

* cited by examiner

*Primary Examiner* — John E Breene
*Assistant Examiner* — Andalib Lodhi
(74) *Attorney, Agent, or Firm* — Fountainhead Law Group PC

(57) ABSTRACT

In one embodiment the present invention includes a computer implemented method of relating data and generating reports. The method includes storing, by an OLAP system, a network data structure that relates a plurality of data objects. The method further includes storing transactional data in an in-memory database in the OLAP system. The method further includes generating, by the OLAP system, a report using the stored transactional data according to the network data structure. In this manner, deficiencies of the traditional star schema paradigm of data warehousing may be avoided.

20 Claims, 17 Drawing Sheets

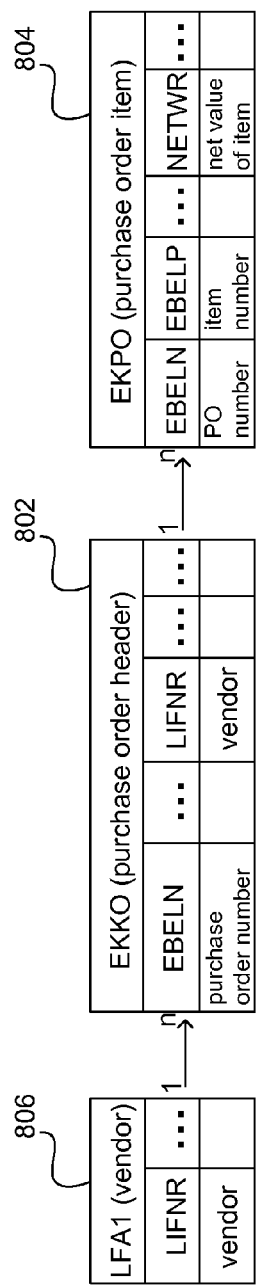
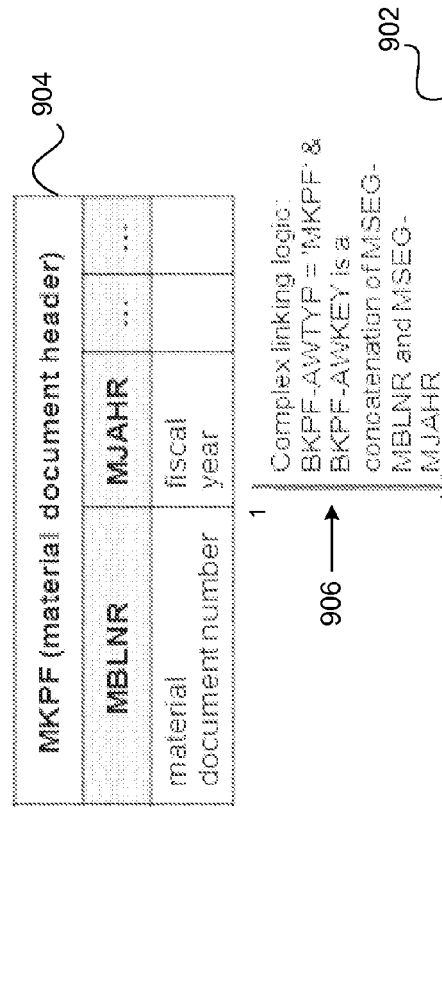
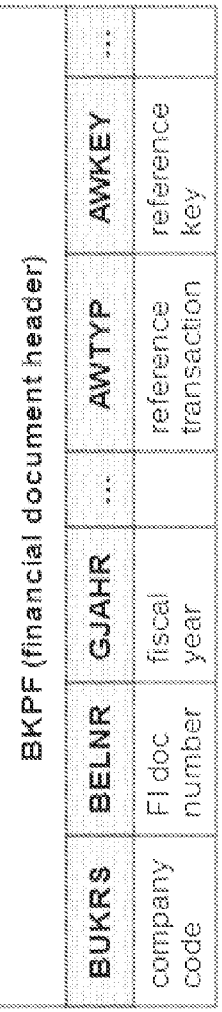
FIG. 8
FIG. 9

| Object Type 1 | Object Type 2 | Relationship Type | ... | Navigation Method | Reverse Navigation Method | ... |
|---|---|---|---|---|---|---|
| ... | ... | ... | ... | ... | ... | ... |
| PO Header | PO Item | 1_n | ... | | | ... |
| PO Header | Vendor | n_1 | ... | | | ... |
| ... | ... | ... | ... | ... | ... | ... |
| Material Doc. Header | Financial Doc. Header | complex | ... | nav_mdoc_to_fdoc | nav_fdoc_to_mdoc | |
| ... | ... | ... | ... | ... | ... | ... |

1002 → (PO Header / PO Item row)
1004 → (PO Header / Vendor row)
1006 → (Material Doc. Header / Financial Doc. Header row)

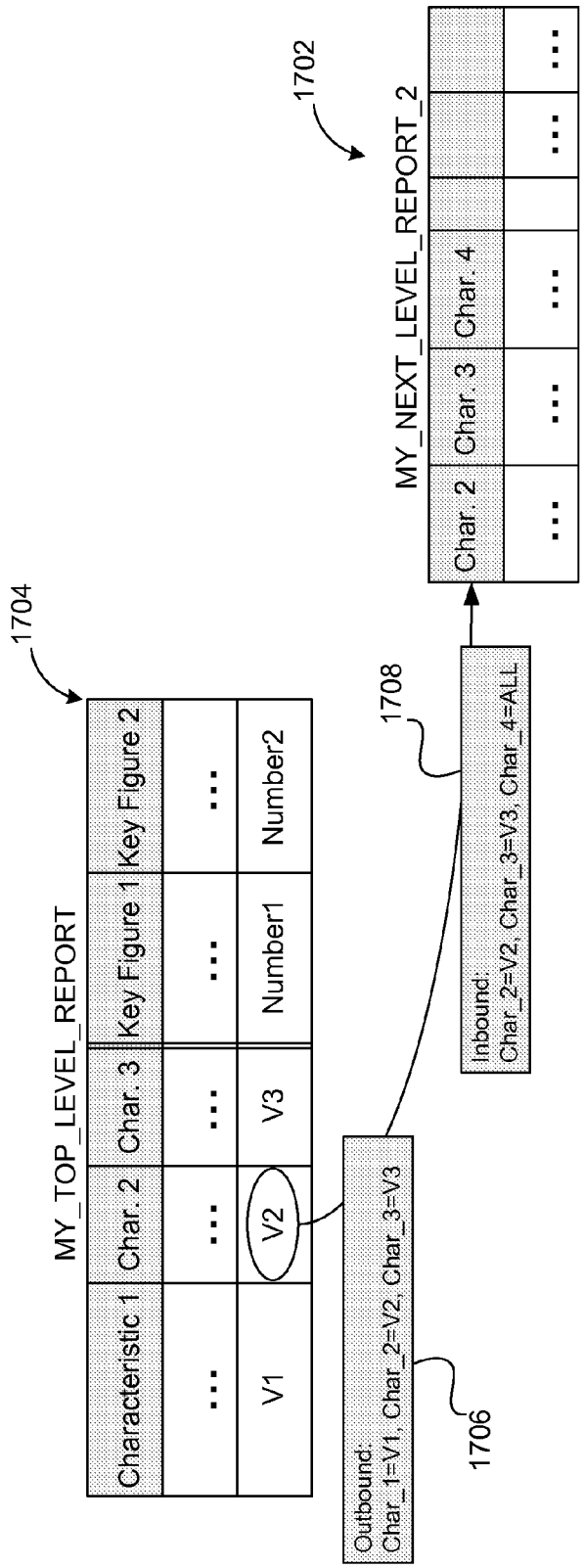

| Object | Attribute | Char or KF | Key Figure Operation | Triggered Report |
|---|---|---|---|---|
| Sales Order Item (VBAP) | Net value of item (NETWR) | Key Figure | SUM | |
| SO Header (VBAK) | SO number (VBELN) | Key Figure | COUNT | |
| Country (T005) | Country ID (LAND1) | Characteristic | | SALES_BY_COMPANY |
| Customer (KNA1) | Customer Number (KUNNR) | Characteristic | | |

2602 →

| Object | Attribute | Role | Key Figure Operation |
|---|---|---|---|
| Sales Order Item (VBAP) | Net value of item (NETWR) | Key Figure | SUM |
| SO Header (VBAK) | SO number (VBELN) | Key Figure | COUNT |
| Country (T005) | Country ID (LAND1) | Input Parameter | |
| Company (T001) | Company code (BUKRS) | Characteristic | |
| Customer (KNA1) | Customer Number (KUNNR) | Characteristic & Input Parameter | |

2702 → (Country row)
2704 → (Customer row)

FIG. 27

| Country | Customer | Number of Sales Orders | Value of Sales Order Items |
|---|---|---|---|
| United States | Customer 1 | 123 | 1234.56 |
| *United States* | *Customer 2* | *456* | *6543.21* |
| United States | Customer 3 | 789 | 8765.43 |
| Germany | Customer 1 | 654 | 2345.67 |
| Germany | Customer 2 | 321 | 7890.12 |
| China | Customer 2 | 987 | 5678.90 |
| China | Customer 3 | 432 | 8765.43 |

2802 → (United States / Customer 2 row)

FIG. 28

| Company | Customer | Number of Sales Orders | Value of Sales Order Items |
|---|---|---|---|
| Branch Company 1 | Customer 2 | 100 | 2000.00 |
| Branch Company 2 | Customer 2 | 100 | 1000.00 |
| Branch Company 3 | Customer 2 | 100 | 1500.00 |
| Branch Company 4 | Customer 2 | 156 | 3043.21 |

FIG. 29

SYSTEM AND METHOD OF RELATING DATA AND GENERATING REPORTS

CROSS REFERENCE TO RELATED APPLICATIONS

Not applicable.

BACKGROUND

The present invention relates to data processing, and in particular, to report generation in online analytical processing (OLAP) systems.

Unless otherwise indicated herein, the approaches described in this section are not prior art to the claims in this application and are not admitted to be prior art by inclusion in this section.

Relational databases are often used to support transactional data processing applications. For example, an invoicing application may use a relational database to store the invoice data. The database may store the invoice data in a table containing rows and columns. The columns define and categorize the invoicing data; for example, the columns may include "invoice number", "invoice date", "customer" and "invoice amount". The rows correspond to the invoice data itself; for example, one row is that invoice number "12345" was generated on invoice date "Jan. 2, 2011" for customer "USPTO" for the amount of "$100.00".

The system that implements a transaction application and its associated relational database is referred to as an online transaction processing (OLTP) system. In an OLTP system, there is a need for fast reads and writes of the transactional data. Queries may be performed on an OLAP system; however when the transactional data set is large, performing a query is slow and negatively impacts the performance of the OLTP system.

In order to perform queries without negatively impacting the performance of the OLTP system, online analytical processing (OLAP) systems were developed. (OLAP systems may also be referred to as data warehouses (DW), business warehouses (BW) or data marts (DM).) Databases configured for OLAP use a multidimensional data model, allowing for complex analytical and ad-hoc queries with a rapid execution time. They borrow aspects of navigational databases and hierarchical databases that are faster than relational databases. The output of an OLAP query is typically displayed in a matrix (or pivot) format. The dimensions form the rows and columns of the matrix; the measures form the values.

Thus, data processing may be performed using both OLTP and OLAP systems together, where the OLTP system handles rapid transaction processing and the OLAP system handles rapid querying and report generation. In order to get the transactional data from the OLTP system into the OLAP system for analysis, traditionally an extraction-transformation-loading (ETL) process is performed. During extraction, the transactional data is extracted from the source OLTP systems. Extraction can be complex when the OLTP systems differ in data organization or data format. During transformation, the transactional data is transformed from the source formats to the desired destination format. For example, amounts in Euros from one OLTP system and amounts in Pesos from another OLTP system may be transformed into amounts in Dollars in the OLAP system. During loading, the transformed data is stored in appropriate data structures in the OLAP system. Since the ETL process involves accessing the OLTP system (which may negatively impact performance), often ETL is performed on a nightly basis when there is otherwise a low load on the OLTP system.

As mentioned above, OLTP systems generally use a relational database that is row oriented. On the other hand, OLAP systems generally use a multidimensional data format. One example of a multidimensional data format is the star schema. (A star schema is a special case of the snowflake schema.) A star schema includes one or more fact tables; each fact table includes one or more dimension tables. The fact table holds the main data. It includes a large amount of aggregated data, such as price and units sold. Dimension tables, which are usually smaller than fact tables, include the attributes that describe the facts. Often each attribute is a separate table for each dimension.

In existent business data analysis tools, to model object/relationship and to design a report is a quite difficult and time-consuming procedure. Even a simple job such as adding one key figure requires deep technical knowledge and takes great effort. More specifically, once the star schema has been defined in the OLAP system and ETL has been performed, to add the key figure may often involve modifying the star schema on the OLAP system, modifying the ETL process performed, modifying the relational data structure in the OLTP system, and performing ETL again once all the modifications have been performed.

To fully understand the situation, let's start by checking an example based on an example data warehouse system to illustrate the limitations and pain points of existent solutions.

Assume the data warehouse customer is Company ABC. ABC already has an analysis report to display the total value of purchase orders placed on each vendor. An example of this report is shown in FIG. 1.

The table in FIG. 1 displays the total value of purchase orders for each vendor. Information is limited in the purchasing area. No information in other areas is involved. E.g., some orders have been paid by ABC and posted to ABC's general ledger for financial accounting, and some orders haven't. A reader cannot tell how much has been paid from this report.

One day, for some reason, the CEO of ABC becomes interested in the influence of purchasing activities on financial statements. She would like to see the total amount of money which has already been paid and posted to the general ledger for each vendor. From business perspective, the requirement is quite simple: add one key figure "Total Amount Posted to General Ledger" to the report of FIG. 1. The new report should be as the table in FIG. 2.

However, that turns out to be a quite challenging task to the BW expert in ABC, who is responsible for supplying the report to the CEO.

The original analysis report of FIG. 1 is based on a BW schema shown in FIG. 3.

In the center of the star schema of FIG. 3 is a fact table Fact_Purchase_Order, with field "Purchase Order ID" as the table key. This fact table contains the purchase order information: how much value is put on each combination of vendor, product and sales organization. Vendor, product and sales organization are dimensions because they represent the measure of sales in one direction. Accordingly, there are three dimension tables (Dim_Vendor, Dim_Product, Dim_Purchase Organization) around the fact table. These dimension tables contain the detailed information of each dimension, such as vendor's country and product's standard price. All these tables are filled with data extracted from ABC's OLTP system according to a nightly ETL process.

However, when it comes to the CEO's new requirement, the BW experts are disappointed to find out that the necessary information to build the new report doesn't exist in the star schema of FIG. 3. That information only exists in ABC's OLTP system. To be more precise, the amount posted to general ledger is contained in financial documents, which are remotely linked to purchase orders and are not part of the star schema of FIG. 3. The relevant database tables of the OLTP system and their relationships are shown in FIG. 4.

Only OLTP experts can easily understand FIG. 4. To put it simpler, the basic logic is: Vendor 400 is referred to by Sales Order 402; Sales Order 402 is linked to Material Document (document of goods receipt) 404; Material Document 404 is linked to Financial Document 406. Most of the link is technically implemented as a foreign key relationship between database tables. But there's one exception: The link 408 between Material Document Item 404*b* and Financial Document Item 406*b* is implemented using complex program logic.

Upon current BW infrastructure, the BW experts have to remodel the star schema of FIG. 3 completely. They have to define new dimensions and adjust the original dimensions. The fact table has to be changed to contain the key figures of material documents and financial documents. That is challenging, because we can see that the data structure of the star schema of FIG. 3 is quite different from that of the database tables of the OLTP system of FIG. 4. The OLTP system's data structure of FIG. 4 is organized as a network in which all database tables in various modules are interlinked via relationships. A huge amount of manual effort is necessary to close the gap between the OLTP structure and the star schema.

A more difficult job is to extract data from the OLTP system to fill into the BW system. BW experts need to cooperate with ERP experts to come up with a complex program to do the ETL job. That program contains SQL statements to read data from different database tables, logic to process the data, and logic to navigate from one database table to another. That requires quite a lot of deep knowledge of the OLTP system's internal program logic and database structure.

What's more, even after the remodeling is done and ETL program is written, BW experts have to reload data from ERP to BW. Old data is replaced with new data. That procedure is quite time-consuming, involving quite a few time-consuming activities (database access and network communication). Normally system administrators make it an asynchronous background job and schedule this job to run in the nighttime, in order to avoid a big impact on the daily operation of the enterprise. Even for incremental data transfer, which is done every day after initial load, the impact is still so big that the ETL job has to be run in the night. Therefore, the CEO's best expectation is to be able to view the data which is only valid one day before.

As discussed above, although the business requirement is apparently simple, difficulties for technical implementation are huge. This fact reflects the major pain points of traditional data analysis tools. Let's summarize them as below:

1) Modeling in the OLAP system requires a huge amount of effort to adapt to the data structure of the data source (e.g., the OLTP system). It's especially difficult if the objects are remotely linked via many intermediate objects (e.g., five objects stay between Vendor 400 and Financial Document 406*b* tables). The user has to write a complex program to read and process data from various database tables. No wonder a small change usually takes a few weeks or months to be done.

2) Deep technical knowledge is critical to the success of such a project. In addition to the knowledge of modeling, a user has to understand the foreign key mapping between database tables in the data source system. Sometimes the program logic (e.g. the logic on 408 to link Material Document Item 404 and Financial Document Item 406) must be understood, too. That logic is more complex than the foreign-key-based relationship. That obviously goes beyond a business user's capacity.

3) Data updating is not fast enough. The analysis tools must go through the time-consuming ETL procedure to load the data. For a user expecting to see the near-real-time analysis report, that's far from sufficient.

SUMMARY

Embodiments of the present invention improve upon the shortcomings of existing OLAP systems, generally by reducing the modeling effort performed by users as well as by increasing the frequency of data updates.

In one embodiment the present invention includes a computer implemented method of relating data and generating reports. The method includes providing an online analytical processing (OLAP) system. The method further includes storing, by the OLAP system, a network data structure that relates a plurality of data objects. The method further includes storing transactional data in an in-memory database in the OLAP system. The method further includes generating, by the OLAP system, a report using the stored transactional data according to the network data structure. In this manner, reports may be generated using real-time data without requiring periodic ETL procedures, and the network data structure allows OLAP reports to be created and modified more easily than in the traditional star schema method.

The transactional data may be additionally stores in an online transaction processing (OLTP) system for performing OLTP functionality using the transactional data. The OLTP system may implement a relational database using a hard drive (for persistent storage) and a volatile memory (for caching). Such OLTP functionality is to be distinguished from the OLAP functionality provided by the OLAP system.

The network data structure comprises a first data object, a second data object, and a relationship, wherein the relationship relates the first data object and the second data object. A single data object may have both a dimension and a key figure. (This may be contrasted with elements of a star schema, where dimension can only be selected from a dimension table, and a key figure can only be selected from a fact table.)

A computer program embodied on a nonvolatile recording medium may control a computer system to relate data and generate reports, as described above. The computer program may include an OLAP component and a reporting component.

A system may controlling a computer system to relate data and to generate reports, as described above. The system may include an OLAP server that implements an OLAP system including an in-memory database.

The following detailed description and accompanying drawings provide a better understanding of the nature and advantages of the present invention.

BRIEF DESCRIPTION OF THE DRAWINGS

FIG. 8 is a block diagram showing an example object model and relationship model according to an embodiment.

FIG. 9 is an example of a complex relationship model.

FIG. 16 shows an example report.

FIG. 17 shows an example of navigating between reports.

FIG. 27 shows another example of attribute selection.

FIG. 28 shows an example of a report.

FIG. 29 shows another example of a report.

DETAILED DESCRIPTION

Described herein are techniques for data analysis and report generation. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

As discussed above, many existing data processing systems are OLTP systems. In contrast, an embodiment of the present invention is directed toward OLAP systems. Where OLTP systems may be optimized for fast read and write access, OLAP systems may be optimized for fast read and query (but not write) access.

Figures 1, 2, 3:
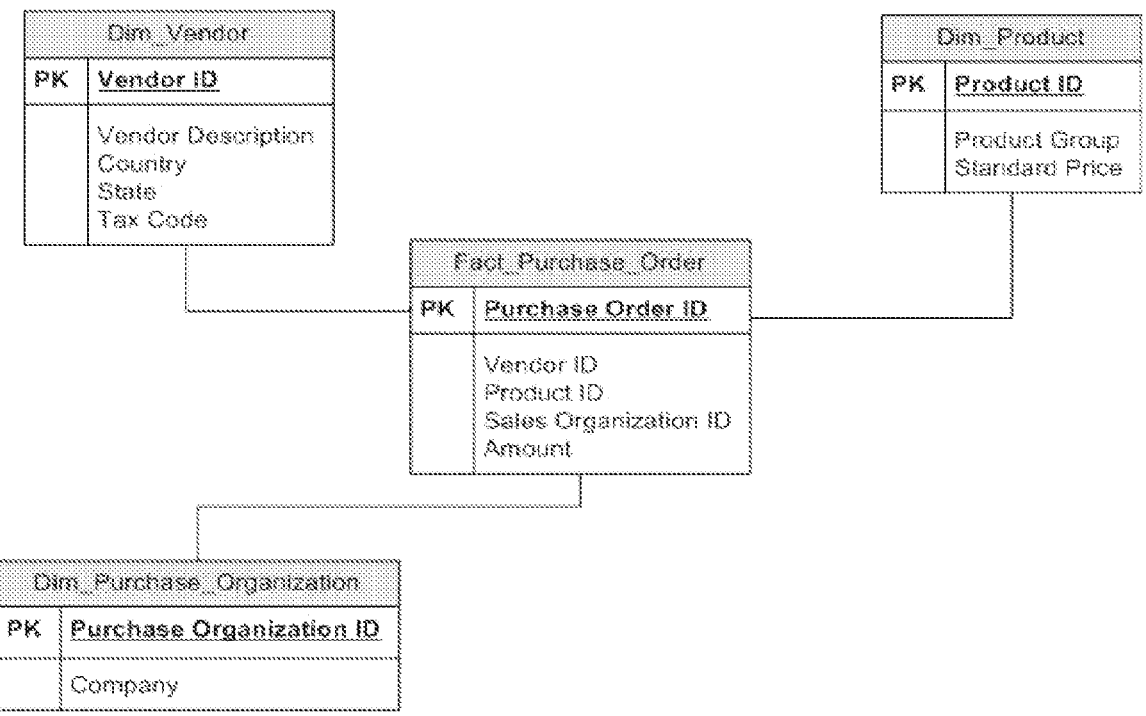
FIG. 1 is an example report.
FIG. 2 is another example report.
FIG. 3 is an example of a star schema.
Figure 4:
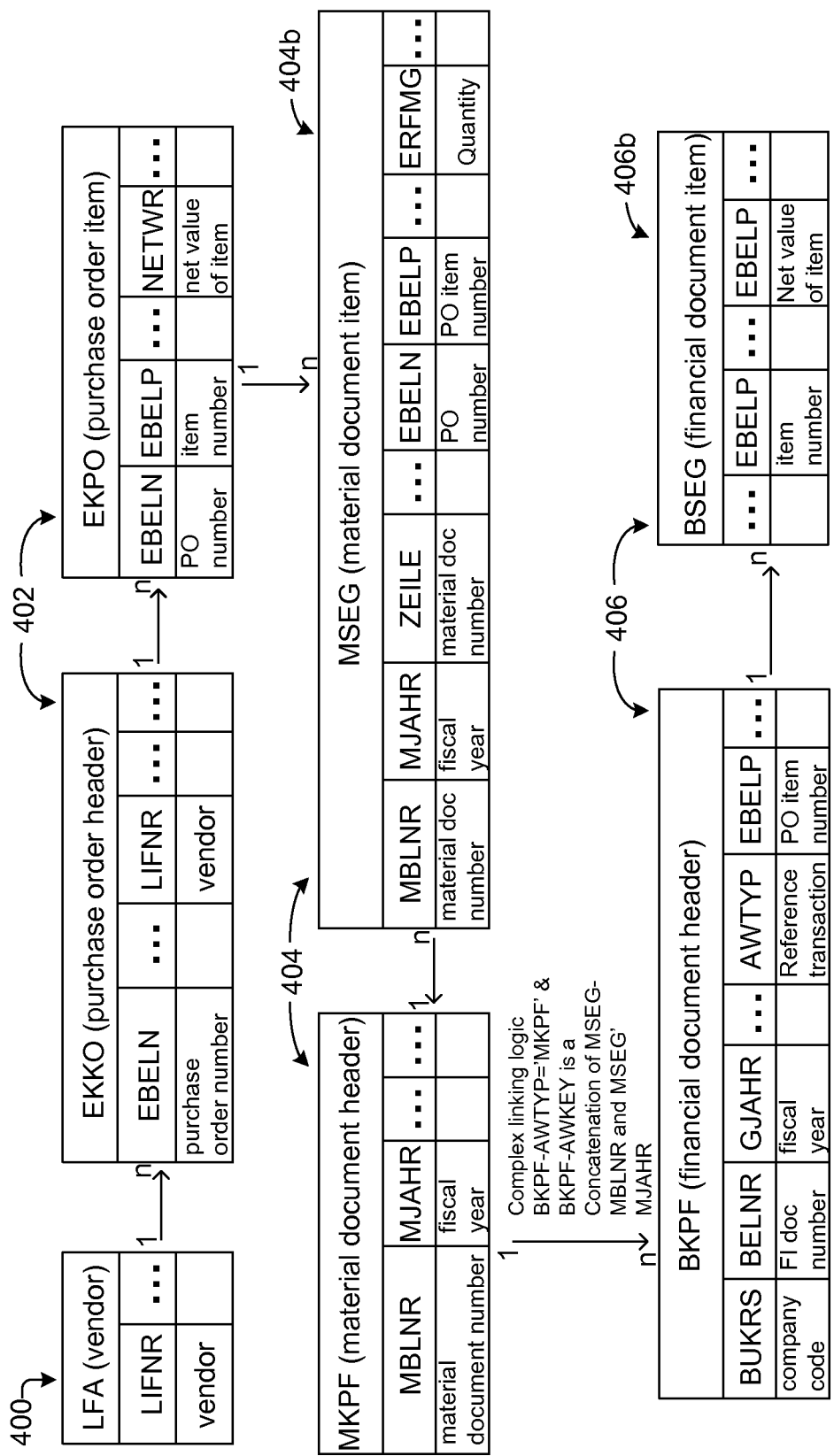
FIG. 4 is an example showing OLTP database tables and relationships.

Many existing systems organize data in a row-oriented fashion. For example, adding a purchasing order to the Purchase Order table 402 in FIG. 2 is a row-oriented transaction. In contrast, an embodiment of the present invention is directed to organizing data in a column-oriented fashion. A column-oriented database serializes all of the values of a column together, then the values of the next column, and so on. However, this "serialization" is a simplification; partitioning, indexing, caching, views, OLAP cubes, and transactional systems such as write ahead logging or multiversion concurrency control all dramatically affect the physical organization. Column data is of uniform type; therefore, there are some opportunities for storage size optimizations available in column-oriented data that are not available in row-oriented data.

Many existing OLAP systems implement a traditional database management system in which data is persistently stored on a hard drive. In contrast, an embodiment of the present invention is directed toward an in-memory database in which data resides in volatile memory and is not persistently stored on a hard drive. Although traditional database management systems perform caching (where on-disk databases keep frequently-accessed records in memory, for faster access), caching does not turn a traditional database management system into an in-memory database system. Caching only speeds up retrieval of information (e.g., a "read"); any database write—that is, an update to a record or creation of a new record—is still written through the cache to disk in a traditional database management system.

Many existing OLAP systems implement a star schema. See, e.g., FIG. 3. In a star schema, one or more dimension tables are connected to a fact table. For example, a fact table is connected to two dimension tables; although there is a "connection" between the two dimension tables, there is no "relationship" between the two dimension tables because by definition the dimension tables are independent. That is, changing one dimension tables has no effect on the other; the only consequence of the change is the resulting effect on the fact table. In contrast, an embodiment of the present invention is directed toward a network data structure. In a networked data structure, two data objects are linked by a relationship (or multiple data objects are linked by multiple relationships). Note that the "relationship" is not a mere connection between a fact table and two dimension tables as in a star schema. Instead, the "relationship" shows, when given the first data object, how to get to the second data object, via the relationship. More specifically, in a star schema, dimension can only be selected from the dimension tables, and key figures can only be selected from the fact table. Whereas in a network data structure, each data object may contain dimensions and key figures. The specifics of the network data structure are detailed in subsequent sections.

In the following description, the terms "design time", "configuration time" and "run time" (or runtime) are used. Design time refers to the environment and tools used to create, administer, and configure content, systems, and services used in a computer system. The design-time environment includes wizards, editors, and configuration utilities for various services, and its users are administrators of the portal. The aim of design time is the creation of a smooth runtime environment in which all end users of the portal perform their daily tasks. Configuration time follows design time. Configuration time refers to a phase during which a collaborative process is configured for a specific system landscape, in which data is selected from a data repository and then configured in an integration directory and finally evaluated by an integration server at runtime. Run time refers to the environment in which users perform their daily tasks, according to the roles defined for them within the organization. The runtime environment may be browser-based, responding to events triggered by the user, who can navigate among business-related content for viewing and analysis. Runtime provides localization capabilities, defined by user locale parameters, as well as offering the user the ability to personalize portal appearance and the organization of information. The portal runtime environment is directly affected by the actions of administrators during design time.

Figure 5:
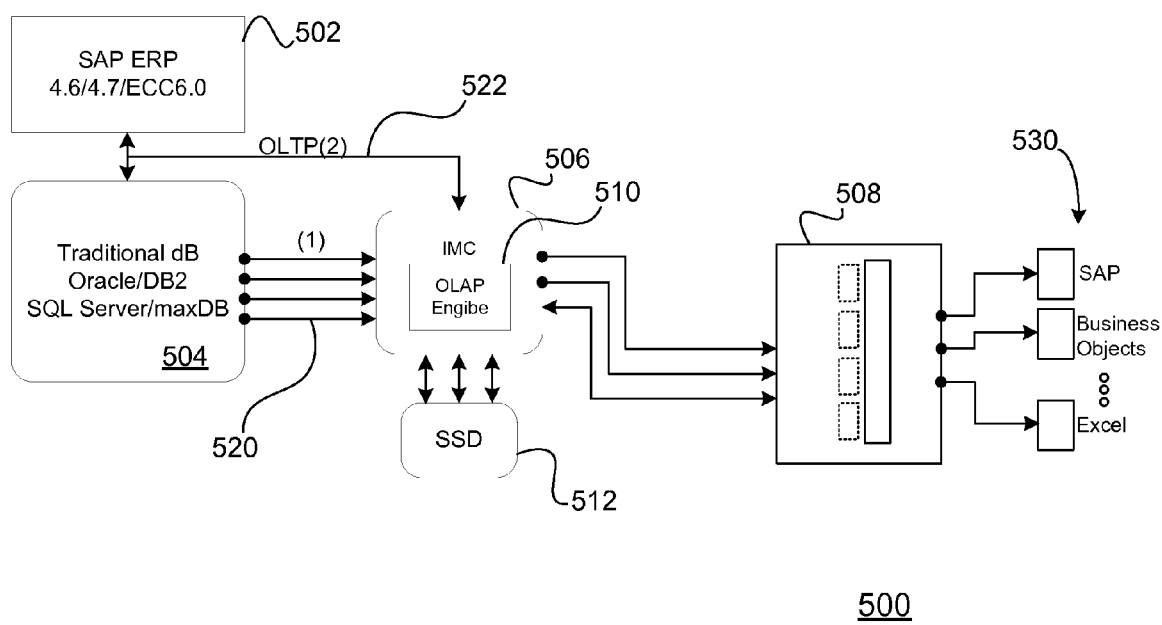
FIG. 5 is a block diagram illustrating a data processing system according to an embodiment of the present invention.

FIG. 5 is a block diagram illustrating a data processing system 500 according to an embodiment of the present invention. The system 500 includes an enterprise application system 502, an OLTP system 504, an OLAP system 506, and a reporting system 508. The enterprise application system 502 generally implements one or more enterprise applications such as invoicing, supply chain management, etc. The OLTP system 504 generally implements a transactional database. Such a transactional database is generally a relational database such as an Oracle™ database, a DB2™ database, an SQL Server database, a MaxDB™ database, etc. In general, the OLTP system includes a hard drive for persistent storage, and a volatile memory (RAM, etc.) for temporary data storage and caching.

The OLAP system 506 generally implements an in-memory database that stores data for OLAP purposes. The OLAP system 506 includes an OLAP engine 510 that processes data (read, write, query, etc.) and sold state devices (SSD) 512 that store the data. The OLAP system 506 may receive its data over numerous paths. Along path 520, data may be extracted from the OLTP system 504 according to an ETL process. Along path 522, the transactional data itself may be provided to both the OLTP system 504 as well as the OLAP system 506. (In contrast to ETL along path 520, the path 522 may be described as "continuously" providing the data.)

The OLAP system 506 is a game changer in the database domain. Compared to traditional database systems, it has the following distinguishing features. First, a huge amount of data is stored in memory as well as in data files. This makes reading/searching of data extremely fast. Second, data is stored in the column-based style instead of the traditional row-based style. Values in the same column are grouped together. This makes the statistical calculation (SUM, MAX, MIN, AVERAGE, etc.) much faster. Third, as data storage for analysis system, the OLAP system 506 is connected to the operational system (the application system 502) via the path 522. Database tables of the application system 502 are initially replicated into the OLAP system 506. And any delta change to the data in the application system 502 is automatically transferred to the OLAP system 506 via database change log. This ensures that the data is available to the OLAP system 506 in near-real-time.

The reporting system 508 provides a report development and generation interface to the OLAP system 506. The reporting system 508 can provide reports 530 output in a variety of formats such as SAP™ format, Business Objects™ format, Microsoft Excel™ format, etc.

Further details of the function and operation of the components of FIG. 5 are provided in subsequent sections.

Figure 6:
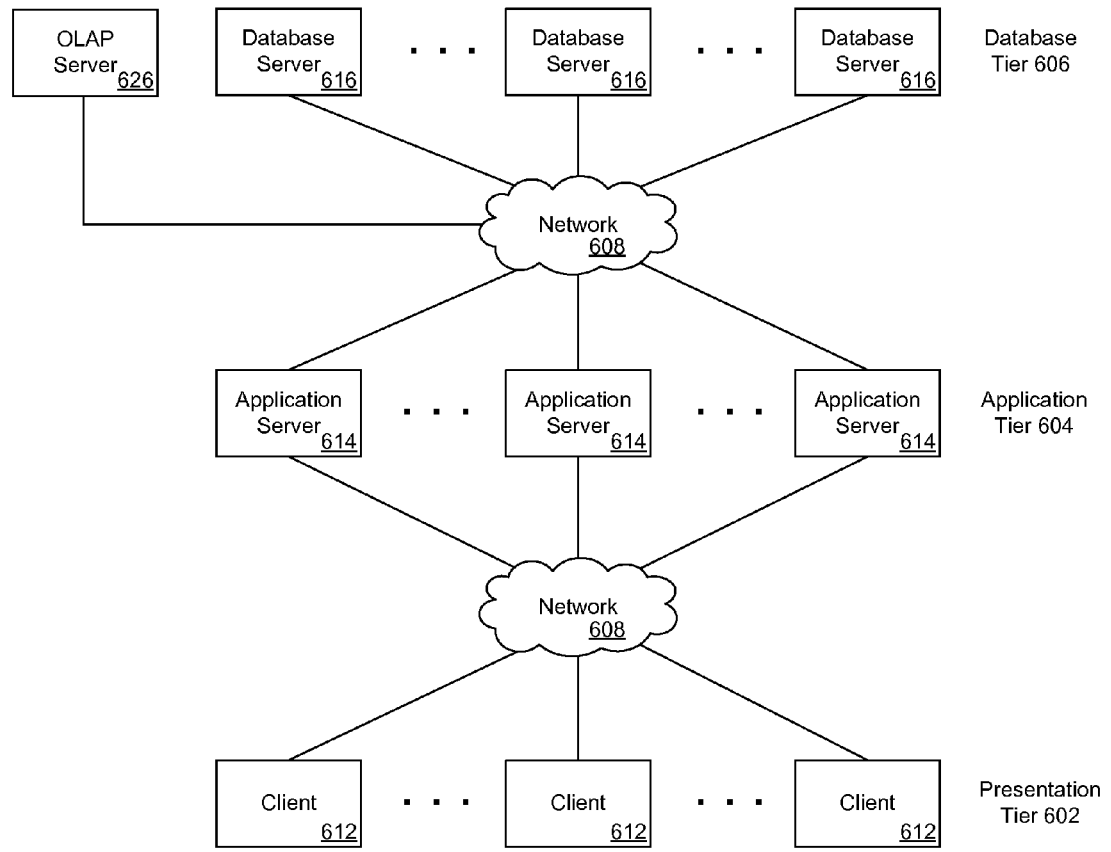
FIG. 6 is a block diagram of a three tier architecture system that may be used to implement an embodiment of the present invention.

FIG. 6 is a block diagram of a three tier architecture system 600 that may be used to implement an embodiment of the present invention. The system 600 includes a presentation tier 602, an application tier 604, and a database tier 606. A network 608 connects the devices within and between the tiers. The network 608 may include one or more networks, such as a local area network, a wide area network, or the internet.

The presentation tier 602 generally includes one or more client computers 612. The client computers 612 generally provide a graphical user interface for users to interact with the other parts of the system 600. The user interface may be implemented by a browser, for example as a Java application.

The application tier 604 generally includes one or more application servers 614. The application servers 614 generally implement the business logic for processing interactions between the users and the underlying data. This business logic is generally referred to as "the application" or "the application program". The application tier may implement various applications to perform various functions, such as invoicing, inventory control, supply chain management, etc. Various of the application servers 614 may perform different functions. For example, one of the application servers 614 may be used for prototyping or development, while the others may be used for business intelligence production activities. More specifically, some of the application servers may implement OLTP functionality of the enterprise application system 502 (see FIG. 5), and some of the application servers may implement OLAP functionality of the OLAP system 506 and the reporting system 508.

The database tier 606 generally includes one or more database servers 616. The database servers 616 generally implement a database management system that stores and manipulates the underlying data and related metadata in an OLTP manner. This database management system is generally referred to as "the database" or "the database system" or "the database program". More specifically, the database servers 616 may implement the OLTP system 504 (see FIG. 5). The database servers 616 may implement various types of database systems, including DB2, Informix, MaxDB, Oracle and Microsoft SQL Server™.

The database tier 606 also includes an OLAP server 626. The OLAP server 626 generally implements the OLAP system 506 (see FIG. 5), including related components to implement the in-memory database (e.g., the SSD 512) and the OLAP engine 510. As discussed above, the OLAP system 506 implement OLAP functionality, as opposed to the database servers 616 that implement OLTP functionality. Further details of the OLAP system 506 are provided in subsequent sections.

Although many separate devices are shown in each tier, such is mainly for illustration purposes to show scalability. For example, a single database server 616 may be used to support OLTP transactions in the basic configuration, but as the amount of data in the databases increases, the number of database servers 616 may be increased. As another example, a single application server may be used in the basic configuration, but as the amount of business logic processes increases, the number of application servers 614 may be increased.

The system 600 may be implemented in a variety of operating systems, for example, UNIX (AIX, HP-UX, Solaris, Linux), Microsoft Windows, IBM Series i (former iSeries, AS/400) and IBM zSeries (former S/390). The various devices in the various tiers may implement different operating systems. For example, a client computer 612 may run Microsoft Windows™ and an application server 614 may implement Linux. Note that various devices generally implement both an operating system program and another program, which are distinct. For example, a client computer 612 may implement Microsoft Windows™ (operating system) and Microsoft Internet Explorer™ (user interface program). An application server 614 may implement Linux (operating system) and an invoicing system (application program). A database server 616 may implement Linux (operating system) and Oracle database (database program). The SAP Web Application Server™ is a specific example of an implementation of the system 600.

Implementation Details

According to an embodiment, a noteworthy aspect is to perform the modeling and reporting based on network data structures instead of the traditional star schema. With this infrastructure, no star schema modeling is required because all networked objects are globally available. No asynchronous ETL is necessary because operational data is already replicated in near-real-time and cached in memory for fast reading/searching.

Figure 7:
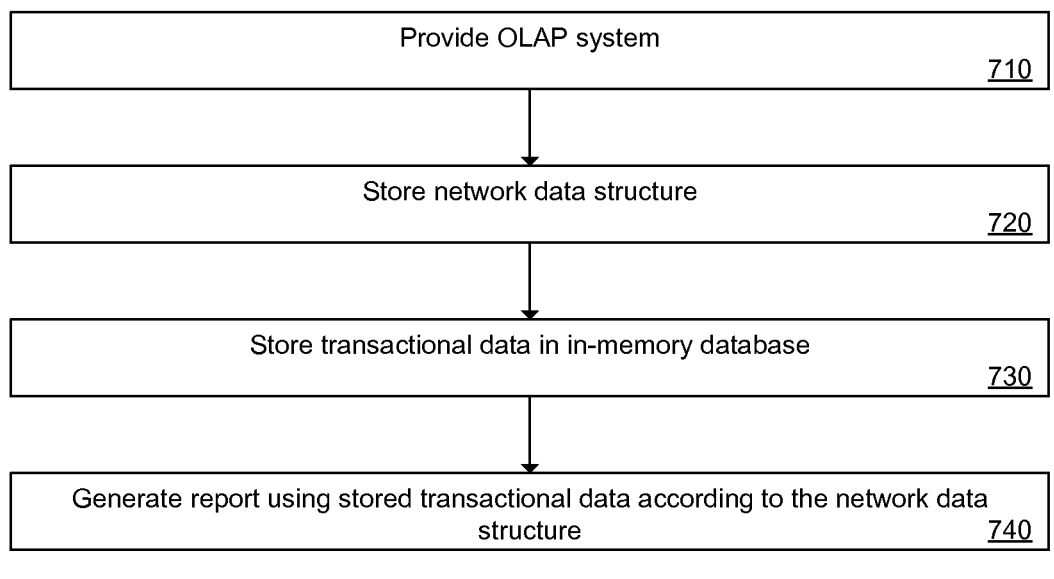
FIG. 7 is a flowchart of a method 700 according to an embodiment.

FIG. 7 is a flowchart of a method 700 according to an embodiment. The method 700 corresponds to a computer implemented method of relating data and generating reports. The method 700 may be implemented by a computer system such as the system 600. The computer system implementing the method 700 may be controlled according to various computer programs.

At 710, an OLAP system is provided. The OLAP system may be the OLAP server 626 (see FIG. 6) that implements the OLAP system 506 and the reporting system 508 (see FIG. 5).

At 720, the OLAP system stores a network data structure that relates a plurality of data objects. The network data structure may be created or edited by a user interacting with the OLAP system, for example via a client computer 612 (see FIG. 6). Further details regarding the network data structure, as well as the user interface tools used to build and manage the network data structure, are provided below.

At 730, the OLAP system stores transactional data in an in-memory database in the OLAP system. For example, the OALP server 626 (see FIG. 6) may implement the OLAP system 506 (see FIG. 5), which receives transactional data along path 522 and which stores the transactional data in an in-memory database in the SSD 512.

At 740, the OLAP system generates a report using the stored transactional data according to the network data structure. For example, the reporting system 508 may generate the reports 530 by requesting the OLAP system 506 to access (according to the network data structure) the transactional data stored in the SSD 512 (see FIG. 5). The user may create or edit reports by interacting with the OLAP system, for example via the reporting system 508 as accessed by a client computer 612 (see FIG. 6). Further details regarding reporting, as well as the user interface tools used to build and manage reporting, are provided below.

Modeling

An analysis report is based on individual objects. The first step for report-generation is to model the objects and their relationships. FIG. 8 is a block diagram showing an example object model and relationship model according to an embodiment.

Object modeling is based on underlying database tables and views (e.g., as configured in the OLTP system or relational database system). For example, object "Purchase Order Header" 802 is defined based on the table "EKKO". Object "Purchase Order Item" 804 is defined based on the table "EKPO". (EKKO and EKPO are two standard tables in a SAP application environment; other application environments may use other names for similar tables or may use other tables.) These two objects 802 and 804 both contain transaction data of purchase orders, one for header (802) and the other for item (804). There's a "1 to n" relationship between these objects since one purchase order has only one header and can have multiple items. This relationship is defined through the foreign-key attribute "Purchase Order Number". This is consistent with the underlying database structure, in which the table "EKKO" represents "Purchase Order Header", the table "EKPO" represents "Purchase Order Item", and the two tables are interlinked via foreign key "EBELN" (Purchase Order Number). Similarly, the "Vendor" object 806 and "Purchase Order Header" object 802 are linked through attribute "Vendor ID". This is because multiple purchase orders can be placed on a vendor.

Besides object modeling, relationship modeling is important, too. There are simple relationships as is described in the above paragraph with reference to FIG. 8. At the same time, there are some relationships that are not represented by something as simple as a foreign key (as in FIG. 8). FIG. 9 shows an example that describes the complex logic 906 that links the "Financial Document Header" object 902 and the "Material Document Header" object 904.

No doubt, such a complex linking logic 906 is still based on object attributes. But it's implemented by program logic, instead of database foreign key. Whether the relationship is foreign-key-based or program-based, this proposed solution provides a consistent mechanism to build the relationship model. That is described in FIG. 10.

Figures 10, 11:
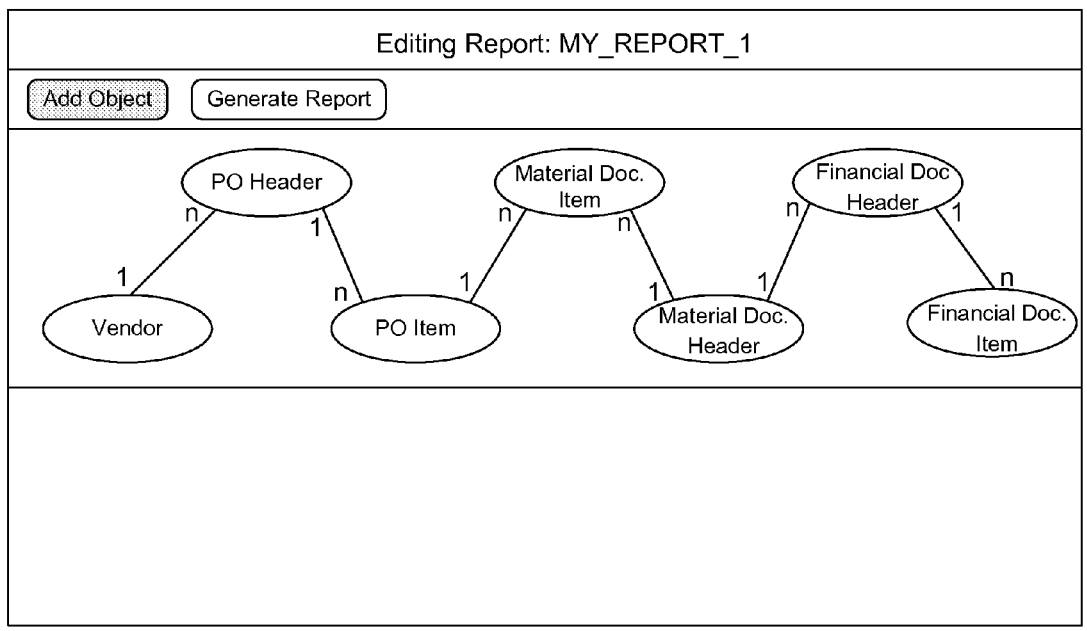
FIG. 10 is an example of a relationship model according to an embodiment.
FIG. 11 shows an example of objects in a report builder according to an embodiment.

The relationship modeling is based on a configuration table as shown in FIG. 10. This configuration table may also be referred to as a "network data structure" as discussed above. For simple relationships such as the "PO Header→PO Item" and "PO Header→Vendor", entries like lines 1002 and 1004 are filled. We can see that the columns "Object Type 1" and "Object Type 2" contain the names of the two objects at both ends of the relationship. The field "Relationship Type" can be "1_n", "n_1" or even "1_1". This field controls how the underlying database tables are joined during runtime data extraction. The network data structure may contain other information specifying which attributes of an object serve as foreign keys of another object; this information is not displayed in FIG. 10 for simplicity. The relationship type definition is symmetric, therefore only one direction need be defined. That is, the "1_n" relationship from "PO Header" to "PO Item" (line 1002) implies an "n_1" relationship in the reverse direction.

For complex non-foreign-key-based relationships, entries like the line 1006 in FIG. 10 should be filled. Here we can see that the value of field "Relationship Type" is "complex". For this relationship type, the fields "Navigation Method" and "Reverse Navigation Method" must be filled to control how the underlying database tables are read and linked during run time.

Two navigation methods are shown in FIG. 10, namely "nav_mdoc_to_fdoc" and "nav_fdoc_to_mdoc" (the reverse). In general, a navigation method is a block of program logic with input and output parameters. The program logic controls how objects of type 1 are linked to objects of type 2. Its input is the keys of the "type 1" objects and its output is the keys of the linked "type 2" objects. In other words, given objects at one end of a relationship, this navigation method calculates what objects are at the other end. This navigation method will be called by the framework during run time to render the report. It implements the standard interface with keys of "type 1" objects as input and keys of "type 2" objects as output. The reverse navigation method plays a similar role, just in the reverse direction.

TABLE 1 shows pseudo code of the navigation method used in the example (navigation from material document to financial document):

TABLE 1

```
Method nav_mdoc_to_fdoc( Input_Keys )
{
    SELECT key fields FROM BKPF
        WHERE   AWTYP = 'MKPF'
        AND     AWKEY = Input_Keys.MBLNR and
                Input_Keys.MJAHR.
    RETURN the selected key fields.
}
```

This logic is consistent with the complex logic linking Material Document Headers and Financial Document Headers, which is described in FIG. 9.

The ultimate way to save a customer's effort is to do the modeling job once for all. Therefore SAP systems may provide commonly used object models and relationship models as out-of-box business content for both OLTP and OLAP systems. Users of this framework only need to model their self-defined objects and relationships.

Report Building

After objects and relationships are defined, a user may build the report based on the objects and relationships. According to an embodiment, the work may be done in an application called Report Builder. Report Builder is a configuration-time tool. Its purpose is to edit the structure and data source of a report and generate the corresponding metadata. All the generated artifacts will be used in run-time to control data-reading and report-rendering. This Report Building section goes through the procedure of report building and explains each step by building a report for the sample scenario mentioned in the previous sections.

The first step to build a report is to select all the objects and their relationships used in this report. Objects and relationships are prepared in the modeling step described in the previous section. For each report, some of them are selected and added into the Report Builder, an example of which is shown in FIG. 11. This is done by clicking on the "Add Object" button in FIG. 11. User can search for objects using names, descriptions, etc. and place interested objects in the report.

FIG. 11 shows how the report builder looks like after the objects and relationships are selected. From the top, we can see the report being edited is named "MY_REPORT_1". We can also see, in order to build the financial analysis report required by the CEO, the relevant objects ("Vendor", "Purchase Order Header", "Purchase Order Item", "Material Document Item", "Material Document Header", "Financial Document Header", "Financial Document Item") and the relevant relationships linking them are all selected.

The second step is to select attributes used in the analysis report. Attributes can be grouped into two categories: characteristics and key figures.

Characteristic is used to represent dimension. In this example, since the user would like to see the statistical information for each vendor, then the "Vendor ID" attribute should be selected as a characteristic of this report. (See FIG. 12 as described in more detail below.)

Key figure is used to represent the measure, on which statistical calculation is performed. In this example, the user would like to see the total amount of money posted in general ledger for each vendor. Then the attribute "Amount" of the object "Financial Document Item" should be selected as key figure, since the monetary value posted to general ledger is stored as the value of this attribute. (See FIG. 13 as described in more detail below.)

Please note that user can also generate report to show data detail in the lowest level through setting all selected attributes as characteristic.

Figure 12:
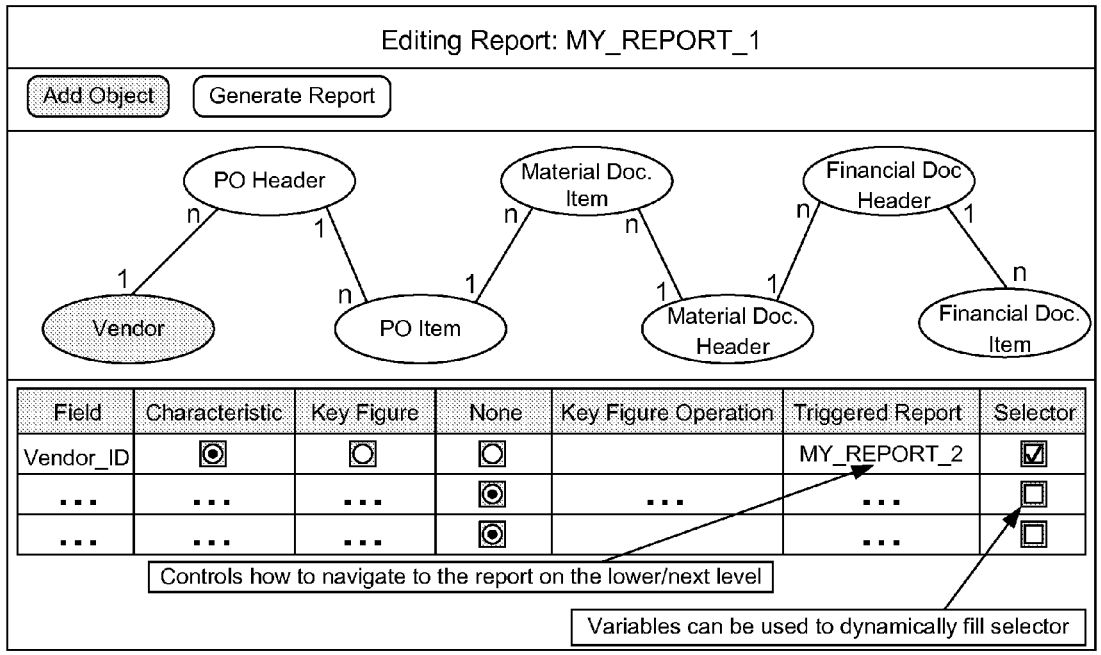
FIG. 12 shows an example of selecting a characteristic in a report builder according to an embodiment.
Figure 13:
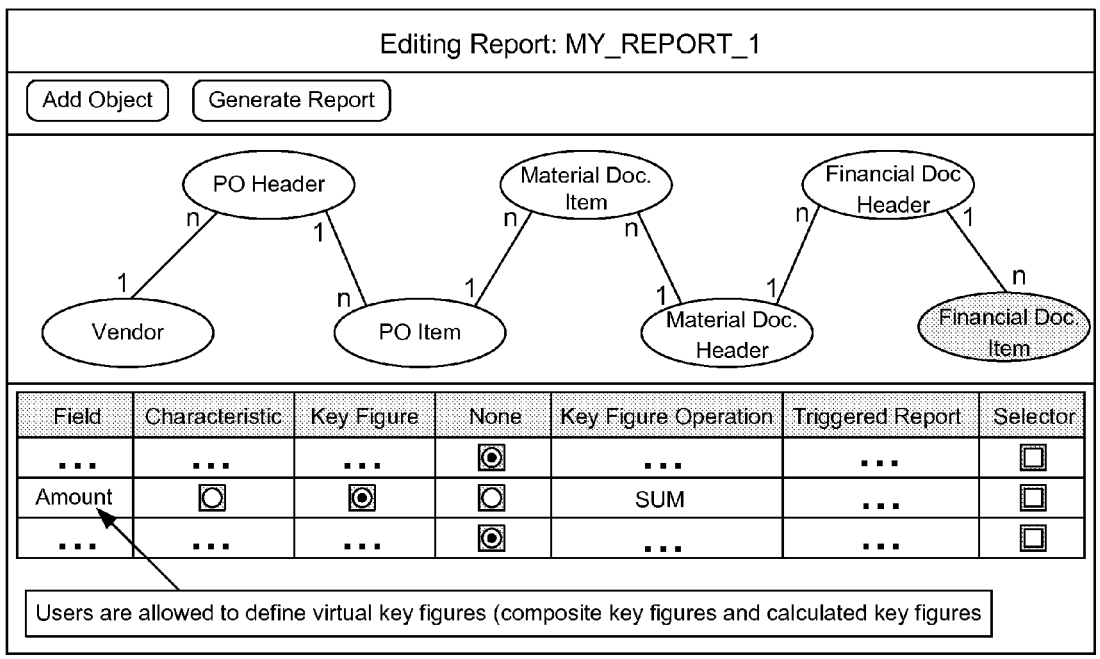
FIG. 13 shows an example of selecting a key figure in a report builder according to an embodiment.

FIGS. 12-13 show more details on how the attributes are selected in the Report Builder. The Report Builder screen has two sections. The top section is a graphical section showing objects and relationships. The bottom section is a textual grid section showing attributes of a selected object.

FIG. 12 shows that when the user highlights an object (e.g., "Vendor"), all attributes of this object are listed in the bottom of the Report Builder. One of the attributes is "Vendor_ID". The user needs to specify the usage of this attribute. Possible options are "Characteristic", "Key Figure" and "None". The user can only select one of the three options (as indicated by the three radio button selection options). If "None" is selected, this attribute will not appear in the report at all. Otherwise, the attribute will serve as a characteristic or key figure in the report. Here the "Vendor_ID" attribute is specified as "Characteristic". That means it will act as a dimension in the analysis report. (Note that other embodiments may use fewer, more, or different options for the attributes.)

Besides usage, an attribute has other properties. One property is the "Triggered Report". This property determines which report will be triggered when the user double clicks (or otherwise selects) the column of this attribute in the report during runtime. This functionality may be used in cross-report navigation and drill-down, as further detailed in a subsequent example of its application. In addition, a more dynamic navigation configuration—conditional navigation—may be performed as further detailed in a subsequent section.

Another property of the attribute is "Selector". If this flag is checked, then this attribute is used to restrict the data selection from database. Selector attributes act as the input parameters of a report. For example, in this report the "Vendor_ID" attribute has the selector flag checked. This means that during run time, the system will use Vendor_ID as one of the data selection criteria. For example, if its value is an array {"Vendor 1", "Vendor 2", "Vendor 3"}, then only the data related to these three vendors are selected from underlying database. No analysis of other vendors is done. This flag is also used in restricting user's authorization (e.g., a manager is only authorized to view the report for specific vendors) and in drill-down (e.g., the user double-clicks on a cell "ABC" of column "Company", then the report is navigated to a more detailed report which shows the information on "Plant" level, in which only the plants in company ABC are included in this new report. To restrict the plant selection, the attribute "Company" must be checked as a selector, even if it doesn't appear in the detailed report.

FIG. 13 shows how to select a key figure attribute. As explained before, the "Amount" attribute is chosen as key figure. The statistical calculation made on this attribute is defined in the "Key Figure Operation" field. Here the function "SUM" is chosen so that the monetary values of all posted financial documents are added up. The final aggregation result will be displayed in the report during runtime.

Figure 14:
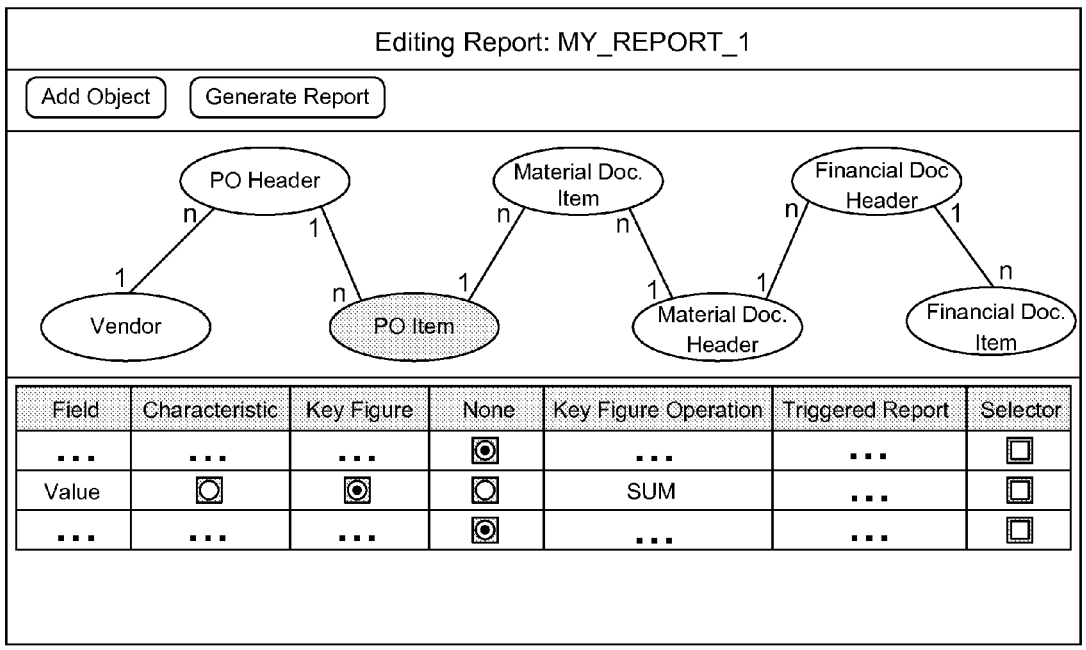
FIG. 14 shows another example of selecting a key figure in a report builder according to an embodiment.

Similarly, another attribute "Value" of the object "PO Item" is also selected as is shown in FIG. 14. This is because in the report we need to display another statistical calculation result "Total Value of Purchase Orders". The source for the statistical information is the "PO Item" object, which contains the line items of the order.

Figure 15:
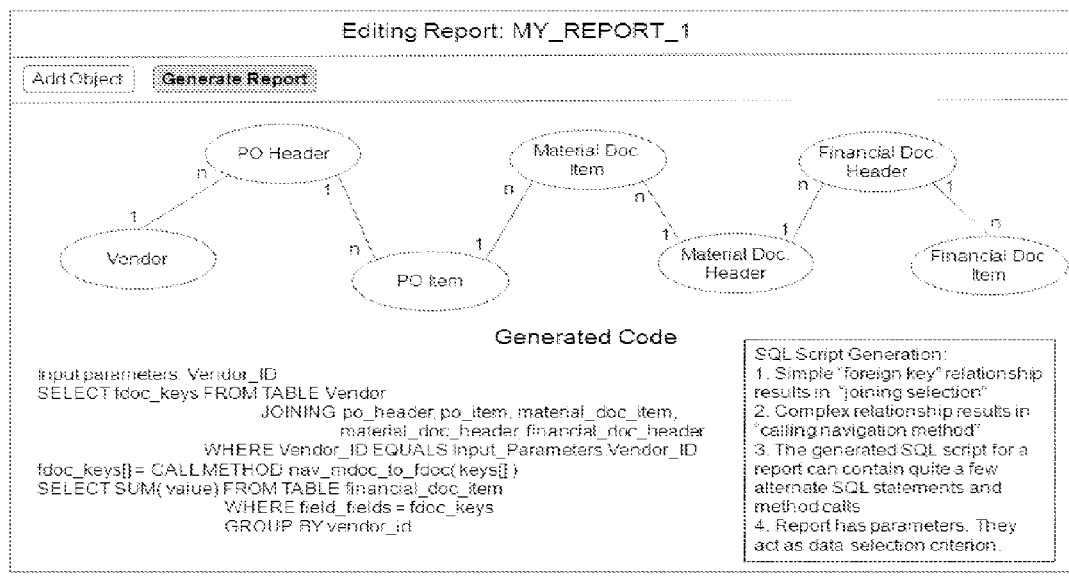
FIG. 15 shows an example of report generation in a report builder according to an embodiment.

The last step in report building is report generation. In FIG. 15, the user clicks on the "Generate Report" button. Then the report metadata is automatically generated by the system 600 (or more specifically, by the reporting system 508), including the SQL statements to read data from backend database and the program to process data. The pseudo code generated is listed in the bottom of FIG. 15.

In the example pseudo code, we can see that the system automatically recognizes the simple foreign-key-based relationships between object "Vendor", "PO Header", "PO Item", and "Material Document Item". So a "Joined Select" statement is generated. It will read data from the tables of these objects. The tables are joined to improve the performance. This is done because the "1 to n" relationship is recognized by this framework automatically. Similarly, the "1 to n" relationship between "Financial Document Header" and "Financial Document Item" is also recognized, so another "Select" statement is generated.

As mentioned before, the relationship between "Material Document Header" and "Financial Document Header" is not as simple as foreign-key-based ones. It's based on program logic. As explained before, the program logic to link these two objects is implemented and registered as a navigation method in the relationship configuration table (see FIG. 10). Recognizing this fact, the system generates a "Call Method" statement, invoking the navigation method to calculate the keys of Financial Document Headers from input keys of Material Document Headers. The program logic is described in the subsequent section "Run Time".

In the generated code, we can see the logic of data access and relationship linking is interleaved together. Performance is ensured because the run-time system (e.g., the OLAP engine 510 in the OLAP system 506 of FIG. 5) reads data using table-joining as long as it is possible. A method call is invoked whenever complex program logic has to be used to represent the object relationships.

Three observations are made. First, the user of the Report Builder needs only to focus on the source of business data (objects and attributes) and on relationship between objects. All the underlying program and SQL statements are generated and transparent to the user. Second, the data source selection is not as restricted as it is in a star schema. Any object in the global network (e.g., the enterprise application system 502 or the OLTP system 504 in FIG. 5) can be used in report building. Third, at the same time, the system performance is improved because the generated code is optimized with table joining (see FIG. 15).

Run Time

The analysis report containing business data and statistical calculation result is rendered during run time. The runtime module processes the artifacts generated by configuration time (Report Builder) and displays the report with data read from data sources. For example, with reference to FIG. 5, the reporting system 508 implements the runtime module and the Report Builder (used during configuration time). FIG. 16 shows the rendered report, which was built as described in the previous sections.

The CEO's requirement to add the key figure has been easily achieved. This is because the detailed logic of data processing has been hidden from the user. The hidden details include data extraction, processing of relationships between objects, statistical calculations, front-end report rendering, and navigation between reports. Regarding data extraction, the system generates SQL statements to read data from underlying database, and configures "joining" logic to improve the performance of data retrieval. Regarding the processing of relationship between objects, the system implements simple foreign-key-based table joining, and invokes methods that implement the complex relationship logics. Regarding statistical calculation, the system performs a variety of functions, including SUM (to get the total value), AVERAGE (to get the average value), MIN (to get the smallest value), MAX (to get the largest value), etc. Regarding front-end report rendering, the UI (user interface) module (e.g., the Report Builder as implemented by the reporting system of FIG. 5) provides a unified interface to the backend (e.g., the OLAP system 506), in order to accept the retrieved data, whatever format the data is in, and the UI processes not only the data, but also the metadata of the report so that the data is properly structured in the front-end (e.g., as provided in the reports 530). Regarding navigation between reports, this functionality is discussed in more detail in subsequent paragraphs.

Navigation logic controls how the system responds when the user wants to drill down or wants to see other information related to the current report. FIG. 17 shows how the navigation mechanism works. As described in the Report Building section, each report has an array of input parameters. During run time, the parameters are filled with values, and the values are used to restrict data retrieval from database. In FIG. 17, the report 1702 is labeled MY_NEXT_LEVEL_REPORT_2 and has 3 input parameters "CHAR_2", "CHAR_3", "CHAR_4". Their runtime values control which data in backend database should be read and displayed in the report.

The report 1704 is labeled MY_TOP_LEVEL_REPORT and has a characteristic "CHAR_2". In Report Builder (see e.g., FIG. 12), its "Triggered Report" property is filled with the name "MY_NEXT_LEVEL_REPORT 2". Therefore, when user double clicks on any cell of this column (member of this characteristic), the next-level report MY_NEXT_LEVEL_REPORT_$_2$ is rendered by the system and displayed to the user.

All characteristic values of the line of the clicked cell will be automatically transferred to the target report 1702. From FIG. 17 we can see the value of "CHAR_1", "CHAR_2", "CHAR_3" are transferred out as outbound parameters 1706 of the report MY_TOP_LEVEL_REPORT. And the inbound parameters 1708 of the target report are filled with the values accordingly. In the figure, we can see that value "V1" is ignored since "CHAR_1" is not one of the input parameters 1708. "V2" and "V3" are automatically given to "CHAR_2" and "CHAR_3" which are shared by the source and target reports 1704 and 1702. The last parameter "CHAR_4" of the target report 1702 is given the value "ALL" since there's no such an outbound parameter from the source table 1704. That means, data selection for the target report 1702 will ignore it. All values will be ok for data reading.

Figure 18:
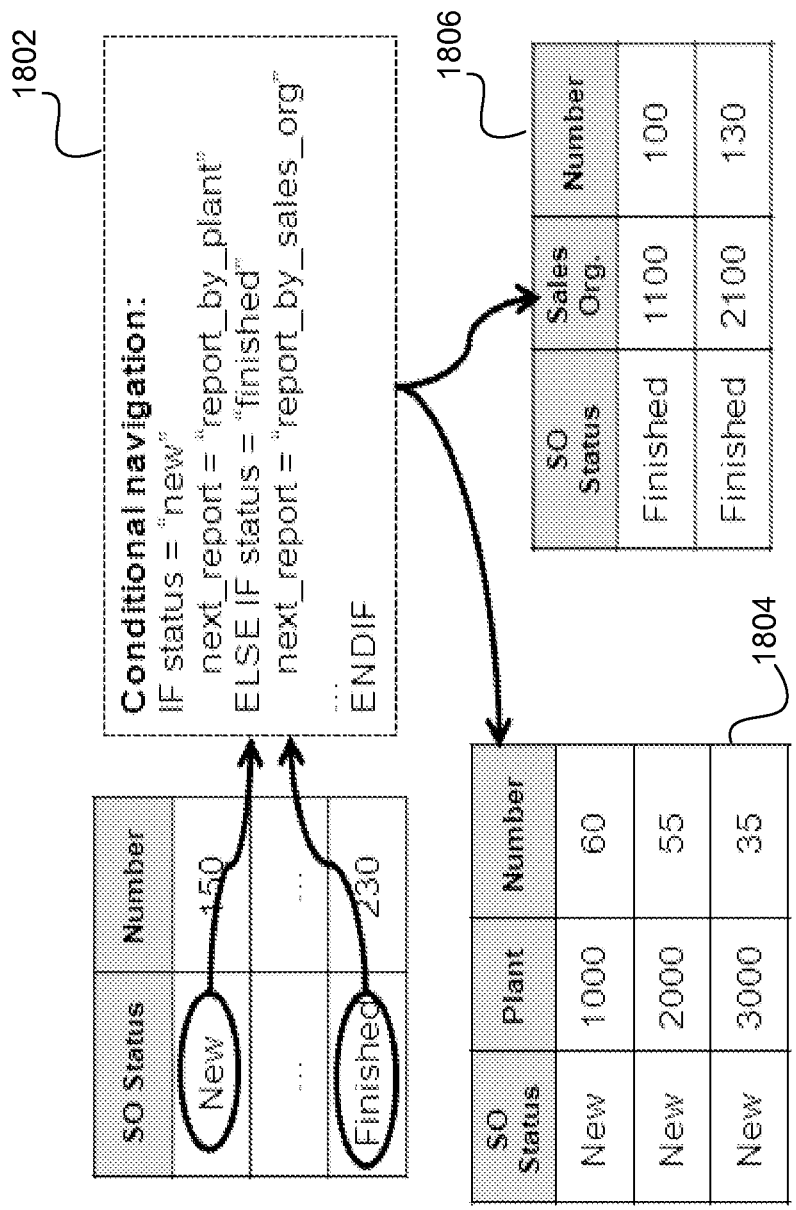
FIG. 18 shows an example of conditional navigation.

It's worth noting that conditional navigation is allowed. Sometimes the user would like to be navigated to different reports according to different values of a characteristic. Then a conditional navigation should be applied. For example, for sales orders with status "New", the user is more interested in the plant-level detail because the products have not been produced and the emphasis is on manufacturing. For those orders with status "Finished", user is more interested in the sales-organization-level detail. Therefore, as shown in FIG. 18, the conditional navigation rule 1802 determines what should be the target report according to the value of the clicked characteristic attribute. More specifically, the rule 1802 navigates to the report 1804 when the status is "new", and to the report 1806 when the status is "finished".

Architecture

Figure 19:
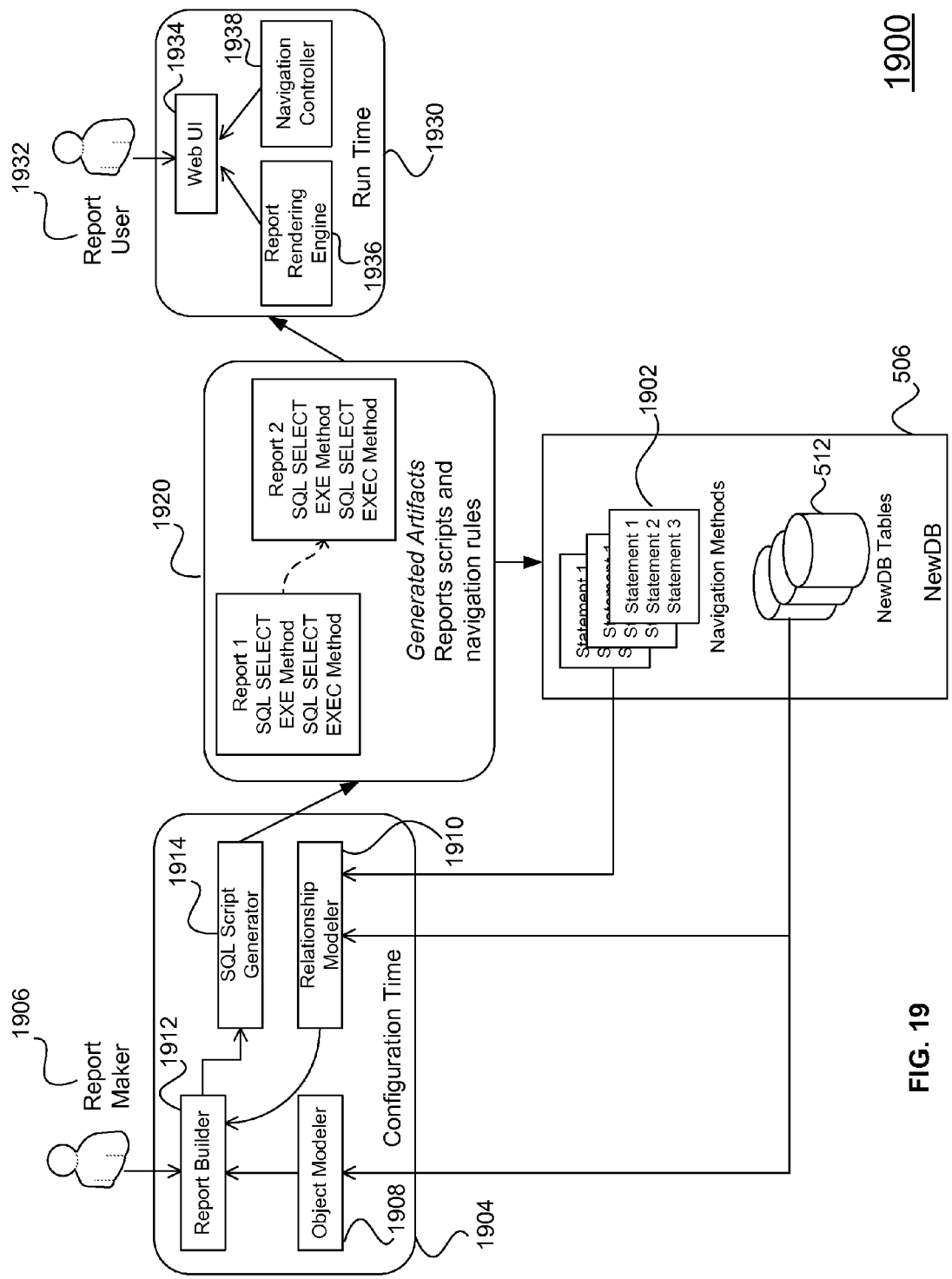
FIG. 19 is a block diagram of a system for relating data and generating reports according to an embodiment.

FIG. 19 is a block diagram of a system 1900 according to an embodiment. The system 1900 is similar to the system 500 showing more details. The OLAP system 506 stores its tables in the SSD 512. These tables act as data sources and provide the basis for object modeling. The navigation methods 1902 implemented in the OLAP system 506 provide logic to model complex relationships.

The configuration time module 1904 is used by the report maker user 1906. As mentioned before, the configuration time module 1904 provides the object modeler 1908 and the relationship modeler 1910 to build the basis for report building. (See above with reference to FIGS. 10-15 and related description.) The report builder 1912 leverages the modeled items to generate reports. Report generation triggers the SQL script generator 1914 to yield generated artifacts 1920.

The generated artifacts 1920 include the report metadata (SQL statements, method call logic, etc.) and the cross-report navigation logic. The generated artifacts 1920 are used by the run time module 1930 to render reports dynamically.

The run time module 1930 is used by the report user 1932. The report user 1932 accesses the web user interface 1934 (e.g., by using a client computer 612 of FIG. 6 to access the reporting system 508 of FIG. 5), which accesses the report rendering engine 1936 and the navigation controller 1938 to do the report display and cross-report navigation, respectively (see above with reference to FIGS. 16-18 and related description).

Additional Technical Points

Six additional technical points are detailed below, relating to key figure splitting, multiple navigation paths, multiple relationships, authorization, self-linked relationships, and hierarchy management.

1. Key Figure Splitting

Figure 20:
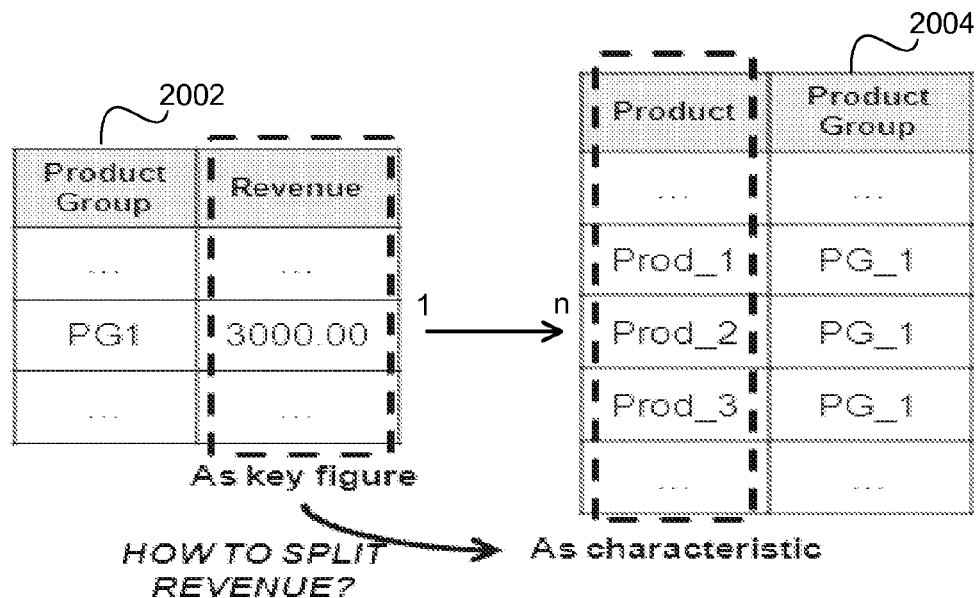
FIG. 20 shows an example of key figure splitting.

Sometimes, the user selects key figures and characteristics in a way that the report has no reliable data source. FIG. 20 provides one such example.

In FIG. 20, we can see that the Objects "Product Group" 2002 and "Product" 2004 have a "1 to n" relationship. But in the data source (2002), the revenue is only available at the "Product Group" level. However, the user has selected the attribute "Product" as the characteristic and "Revenue" as the key figure (see FIGS. 12-14 and related description). That implies that the report should give an analysis for the revenue of each product.

Such a situation may be reported as a warning in the Report Builder. During report generation, if the system finds that there's a "1 to n" relationship and an attribute of the object on the "1" side is specified as a key figure, then a warning is shown to the user. (According to another embodiment, an error is displayed and the user may adjust the model.) Even if the "1 to n" relationship is not a direct link and there're intermediate objects, there's still a warning popping up.

It's a warning instead of an error. So user can ignore it or process it. If user ignores it, then the default splitting logic is executed during runtime. By default, the key figure is evenly distributed to all the relevant characteristics. In this example, each product is given 1000.00 as revenue (i.e., from 3000.00 revenue among three products).

If the user determines to process this warning herself, there're still several options. First, the user may request the system to display "Unknown" in the generated report. This is the simplest and saves calculation time. Second, the user may request the system to distribute the key figure according to historical data (e.g. sales history of each product). Third, the user may request the system to distribute the key figure according to forecast or plan (e.g. sales plan of each product). Fourth, the user may request the system to distribute the key figure according to known key figure values (e.g. cost of each product). Fifth, the user may request the system to inherit the number from the higher level. In this example, each product's revenue is displayed as 3000 (since the product group object 2002 is the higher level). Etc.

2. Multiple Navigation Paths

Between two objects in the relationship network, there might be more than one possible path of relationships. The user should select a unique one to generate the report.

Figure 21:
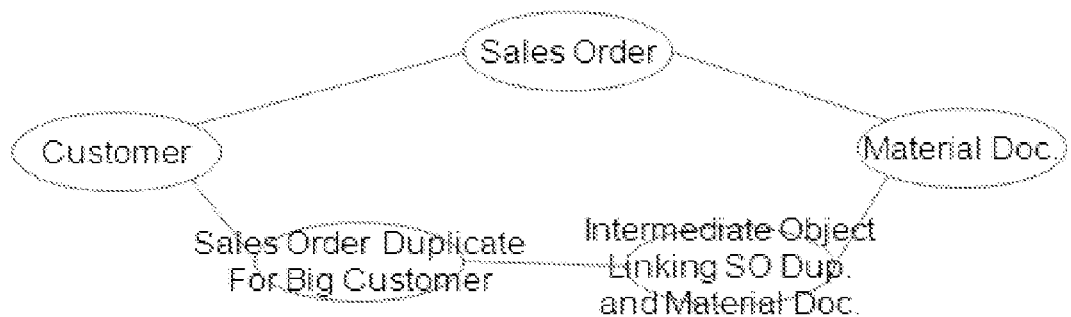
FIG. 21 shows an example of multiple paths.

FIG. 21 is an example of multiple paths. Object "Customer" can be linked to object "Material Document" via object "Sales Order" as shown in the upper path. This implies the logic that the customer places sales orders and sales order results in material documents such as a goods receipt.

Another type of indirect link is shown in the lower path. To improve the operational performance for big customers, there's an object named "Sales Order Duplicate for Big Customer". In the operation system (e.g., the enterprise application system 502 and the OLTP system 504 in FIG. 5), this object is implemented as a table containing duplicates of big customers' sales orders. This object is linked to the object "Material Document" via the object "Intermediate Object Linking SO Duplicate and Material Document", which in the operation system is implemented as a table containing keys of both sales order duplicate table and the material document table.

Even though the upper path is the shortest, the lower path exhibits much better analysis performance due to the small data volume in the intermediate objects (and database tables). Thus, the system allows the user to choose one among all possible paths, which allows the user to use his knowledge of the transactional system (e.g., 502 in FIG. 5) to inform the creation of the relationships in the reporting system (e.g., 508).

Figure 22:
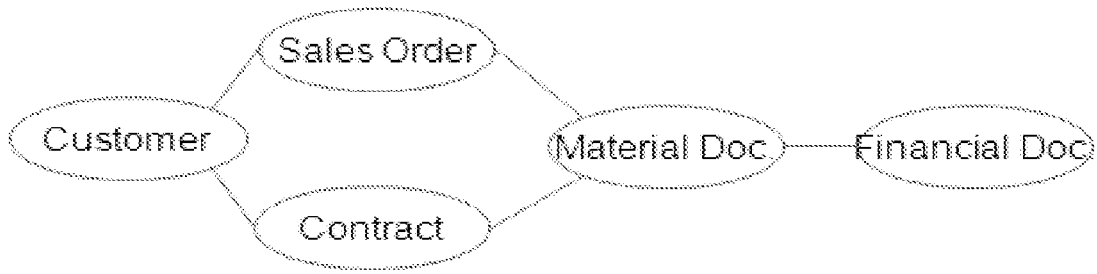
FIG. 22 shows another example of multiple paths.

Another multiple-path scenario is caused by the business ambiguity, for example when customer transactions can cause the posting of financial documents. But those transactions can be done via sales orders or contracts, which are two different objects as shown in FIG. 22. Here, which path to choose is totally dependent on what business context the user faces. If the user needs to analyze the financial key figures posted via contract, although no attribute of object "Contract" is selected as characteristic or key figure, this object still needs to be kept in the Report Builder and the path through this object should be selected, and the upper path and the object "Sales Order" should be removed.

3. Multiple Relationships

Figure 23:
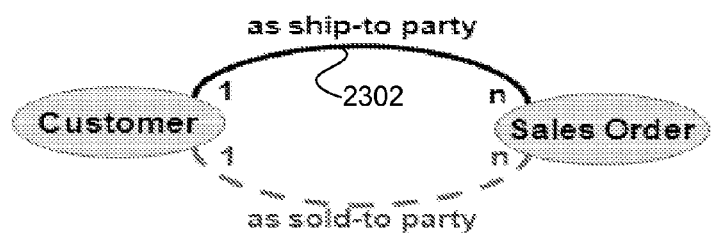
FIG. 23 shows an example of multiple relationships.

Similar to the above point, it is possible that there are more than one relationship between two objects, and FIG. 23 gives such an example. Object "Customer" can act as "Ship-to Party" or "Sold-to Party" of object "Sales Order". Therefore two relationships have to be defined between these objects. If the user only needs to analyze the sales order key figure by ship-to party, then only the first relationship (line 2302) should be selected in Report Builder.

4. Authorization

There are two dimensions of authorization in this solution: the report dimension and the data dimension. In the report dimension, a report is assigned to specific role. For example, only CEO role or CFO role can check the "Cash Flow Report". In the data dimension, for a certain user, only specified values are allowed to be used as input parameters for a report. For example, Manager Thomas is allowed to check the "Sales Report", but he's only allowed to check for sales area "Southeast" and products "Car 1" and "Car 2". So only these parameter values are allowed for the user to read that report.

5. Self-Linked Relationship

Figure 24:
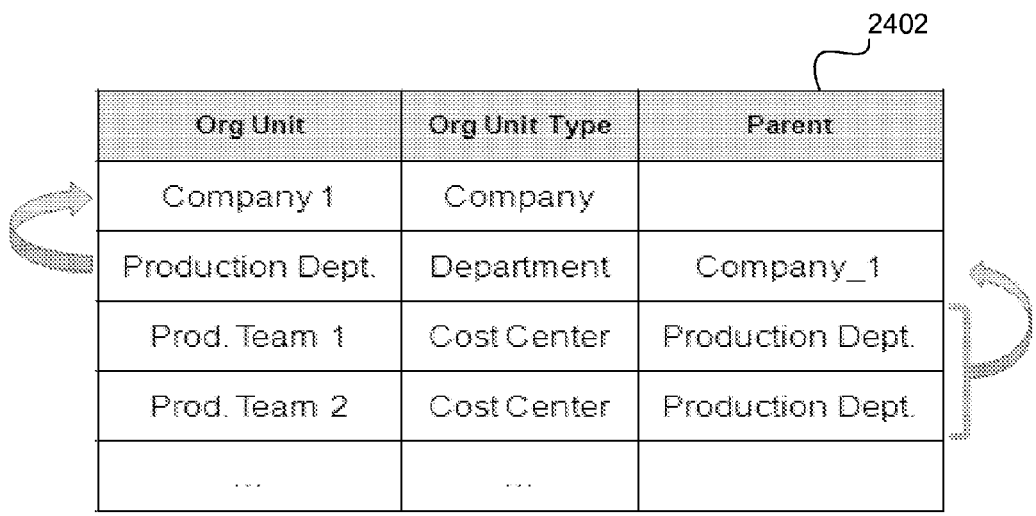
FIG. 24 shows an example of self-linked relationships.

Relationships can not only exist between objects with different types, but also exist between objects with the same type. FIG. 24 shows such an example. It is the table of organization units of an enterprise, including companies, departments, cost centers. These objects are all of the type "Organization Unit", but they have a parent-child relationship. As the column 2402 of the table shows, company "Company 1" is the parent of the department "Production Dept.", and "Production Dept." is the parent of two cost centers "Prod. Team 1" and "Prod. Team 2".

In the relationship configuration table (see, e.g., FIG. 10), there's an entry representing this relationship. Its type is "complex". The "Navigation Method" and the "Reverse Navigation Method" contain the logic of "find children by parent" and "find parent by children".

6. Hierarchy Management

There are three types of hierarchies. The first type is a hierarchy among different objects. For example, in a region hierarchy, country, state, city are different fields in one or different objects; they have a 1:n relationship. For this type, hierarchy navigation can be handled in the UI layer. The second type are hierarchies inside one object. For example, all values of the "Org_unit" field are cross different hierarchy level. For this type, configuration tables are needed to support hierarchy navigation. The third type is a time hierarchy. The time hierarchy is handled as a special hierarchy, a full elaboration of which is beyond the scope of the present description.

Example Scenario

In this section, we use the system to address another concrete problem. By building a set of analysis reports from scratch, we'll see how easy and flexible it is to leverage the capabilities of the system to resolve an arbitrary problem.

The user requirement is a bit more complex. Company ABC's sales general manager said, "I need to see the total value of all sales orders and the number of orders made by all customers in each country. I should be able drill down from the country level to the company level to see the sales situation."

Figures 25, 26:
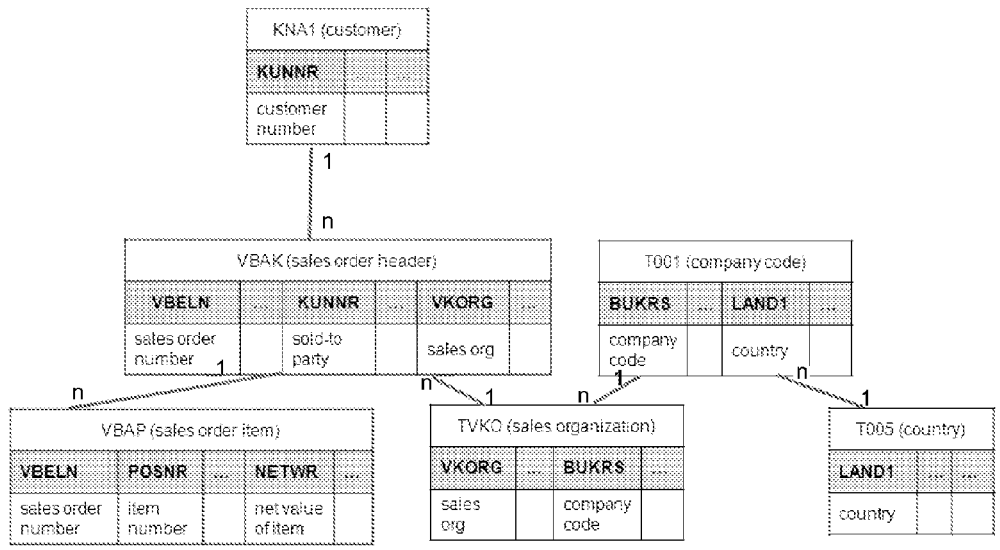
FIG. 25 shows an example of database tables in an OLTP system.
FIG. 26 shows an example of attribute selection.

FIG. 25 shows the database tables existing in ABC's operation system (e.g., the enterprise application system 502 and OLTP system 504 in FIG. 5). As mentioned before, these tables are continuously replicated into the OLAP system 506 (e.g., path 520; alternatively, the transactions may be continuously replicated via path 522).

The business logic behind FIG. 25 is as follows. Each sales order has one header and multiple items ("1 to n" relationship between VBAK and VBAP). The sales order item contains the net value of the item. Each sales order has a sold-to customer ("1 to n" relationship between KNA1 and VBAK). Each sales order has one sales organization ("1 to n" relationship between TVKO and VBAK). Sales organization belongs to a company ("1 to n" relationship between T001 and TVKO). Each company has a base country ("1 to n" relationship between T005 and T001).

When the enterprise application system 502 and OLTP system 504 (see FIG. 5) are implemented by a SAP enterprise resource planning (ERP) system, all these tables are standard SAP ERP stables. The corresponding object and relationship model is completely delivered by the SAP system as business content (e.g., as metadata that defines the structure of the tables). Actually in this example, for each table, one object is defined. So the reporting system 508 (see FIG. 5) may consider each table in FIG. 25 as an object.

In order to satisfy the first part of user requirement ("I need to see the total value of all sales orders and the number of orders made by all customers in each country"), a report named SALES_BY_CUSTOMER_&_COUNTRY is defined. For the last part ("I should be able to drill down from the country level to the company level to see the sales situation"), another report named SALES_BY_COMPANY is defined. When the user double clicks on a country, she should be navigated from SALES_BY_CUSTOMER_&_COUNTRY to the detailed SALES_BY_COMPANY and view the report about sales information in each company in that country.

To build the report SALES_BY_CUSTOMER_&_COUNTRY, the user selects all the objects in FIG. 25 and adds them in the Report Builder (see "add object" in FIG. 11 and related description). Then the user selects some of the attributes of the objects as key figures and some as characteristics (see FIGS. 12-14 and related description). The selection is as shown in FIG. 26.

Field selection for the report SALES_BY_COMPANY is shown in FIG. 27.

Believe it or not, the report building is now done. The system generates two analysis reports. And the reports are automatically equipped with navigation (drill-down) logic. Let's look at how the dynamically rendered report SALES_BY_CUSTOMER_&_COUNTRY looks during run time.

In the row 2602 of the table in FIG. 26, the last cell indicates that the triggered report of the "Country" characteristic is report "SALES_BY_COMPANY". So, when the user double clicks the first cell in the row 2802 of the rendered report (shown in FIG. 28), the navigation logic automatically redirects the user interface and the report "SALES_BY_COMPANY" is rendered as shown in FIG. 29.

The report of FIG. 29 shows the detailed sales information for each company in the United States. Although "Country" is not a visible characteristic in the report of FIG. 29, it is an implicitly used selector as shown in row 2702 of FIG. 27. Only the information of sales made in the US is extracted from the database. And interestingly, only the sales information of "Customer 2" is extracted. That is because, in the row 2704 of the table in FIG. 27, we specify "Customer Number" as input parameter, too. So the report navigation logic automatically fills the "Customer Number" parameter as well as the "Country" parameter with the values of the corresponding fields from the row 2802 of the table in FIG. 28.

SUMMARY

From the descriptions and example scenarios in preceding sections, we see the major advantages of this system, as follows. First, it is very flexible. In contrast to the traditional star schema, in this system any attributes of any objects can be easily accessed to build an analysis report. Second, it's more dynamical. No data dictionary change is required in modeling and report-building. The user doesn't need to worry about the disasters of data loss caused by database structure change. Third, modeling and report-building is very simple. The user can just focus on the business logic, and the technical details are hidden from the business user. Fourth, data is updated very quickly. Based on transactional data replication (see path 522 in FIG. 5), no ETL is required, and any modeling/reporting change can take effect immediately.

Figure 30:
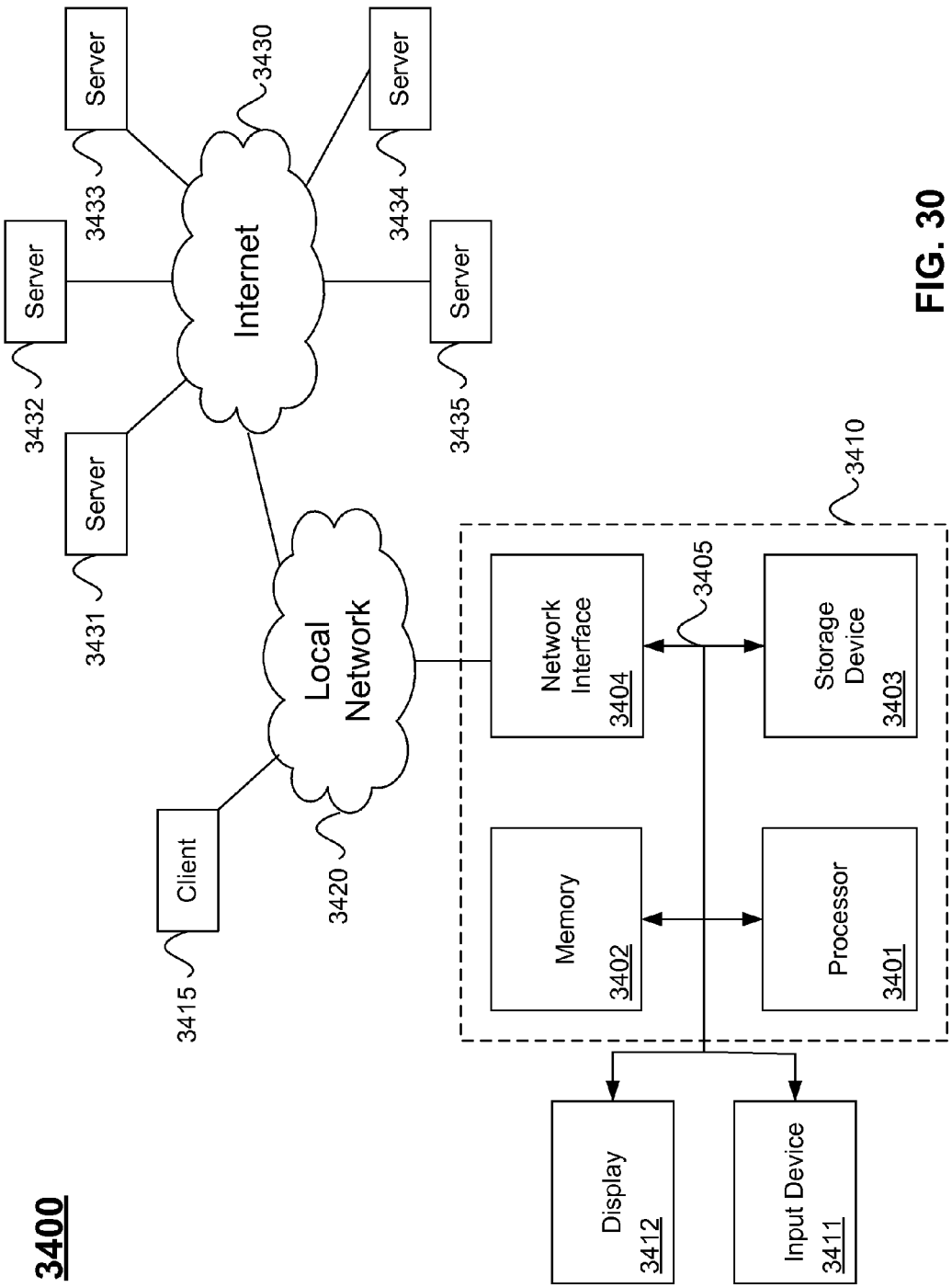
FIG. 30 is a block diagram of an example computer system and network for implementing embodiments of the present invention.

FIG. 30 is a block diagram of an example computer system and network 3400 for implementing embodiments of the present invention. Computer system 3410 includes a bus 3405 or other communication mechanism for communicating information, and a processor 3401 coupled with bus 3405 for processing information. Computer system 3410 also includes a memory 3402 coupled to bus 3405 for storing information and instructions to be executed by processor 3401, including information and instructions for performing the techniques described above. This memory may also be used for storing temporary variables or other intermediate information during execution of instructions to be executed by processor 3401. Possible implementations of this memory may be, but are not limited to, random access memory (RAM), read only memory (ROM), or both. A storage device 3403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 3403 may include source code, binary code, or software files for performing the techniques or embodying the constructs above, for example.

Computer system 3410 may be coupled via bus 3405 to a display 3412, such as a cathode ray tube (CRT) or liquid crystal display (LCD), for displaying information to a computer user. An input device 3411 such as a keyboard and/or mouse is coupled to bus 3405 for communicating information and command selections from the user to processor 3401. The combination of these components allows the user to communicate with the system. In some systems, bus 3405 may be divided into multiple specialized buses.

Computer system 3410 also includes a network interface 3404 coupled with bus 3405. Network interface 3404 may provide two-way data communication between computer system 3410 and the local network 3420. The network interface 3404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 3404 sends and receives electrical, electromagnetic, or optical signals that carry digital data streams representing various types of information.

Computer system 3410 can send and receive information, including messages or other interface actions, through the network interface 3404 to an Intranet or the Internet 3430. In the Internet example, software components or services may reside on multiple different computer systems 3410 or servers 3431, 3432, 3433, 3434 and 3435 across the network. A server 3431 may transmit actions or messages from one component, through Internet 3430, local network 3420, and network interface 3404 to a component on computer system 3410.

The computer system and network 3400 may be configured in a client server manner. For example, the computer system 3410 may implement a server. The client 3415 may include components similar to those of the computer system 3410.

More specifically, the client 3415 may implement a client-side interface for displaying information generated by the server, for example via HTML or HTTP data exchanges. The computer system 3400 may implement the system described above, for example by executing one or more computer programs. For example, the computer system 3410 may implement the enterprise application system 502 (see FIG. 5). The server 3431 may implement the OLTP system 504. The server 3432 may implement the OLAP system 506. The server 3433 may implement the reporting system 508.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method of relating data and generating reports, comprising:
providing an online analytical processing (OLAP) system that includes an in-memory database, wherein the in-memory database stores data in a volatile memory and not persistently on a hard drive;
storing, by the OLAP system, a network data structure that relates a plurality of data objects, wherein the network data structure includes a table having a plurality of columns, wherein the plurality of columns includes a first column for a first data object, a second column for a second data object, a third column for a relationship type that defines how underlying database tables for the first data object and the second data object are joined during runtime data extraction, a fourth column for a forward navigation method for navigating from the first data object to the second data object, and a fifth column for a reverse navigation method for navigating from the second data object to the first data object;
storing transactional data in the in-memory database in the OLAP system as stored transactional data; and
generating, by the OLAP system, a report using the stored transactional data according to the network data structure.

2. The method of claim 1, further comprising:
providing an online transaction processing (OLTP) system; and
additionally storing the transactional data in a relational database in the OLTP system.

3. The method of claim 1, further comprising:
providing an online transaction processing (OLTP) system having a hard drive and a volatile memory; and
additionally storing the transactional data in a relational database in the OLTP system, wherein the OLTP system implements the relational database by storing the transactional data using the hard drive and caching the transactional data using the memory.

4. The method of claim 1, wherein the OLAP system implements the in-memory database using solid state devices.

5. The method of claim 1, wherein the relationship relates the first data object and the second data object.

6. The method of claim 1, wherein the relationship relates the first data object and the second data object, wherein the first data object contains a first dimension and a first key figure, and wherein the second data object contains a second dimension and a second key figure.

7. The method of claim 1, wherein the plurality of data objects correspond to tables in an online transaction processing (OLTP) system that the OLTP system delivers as business content metadata to the OLAP system.

8. The method of claim 1, wherein a data object of the plurality of data objects includes an attribute serving as a characteristic in the report.

9. The method of claim 1, wherein a data object of the plurality of data objects includes an attribute serving as a key figure in the report.

10. The method of claim 1, wherein a data object of the plurality of data objects includes an attribute serving as a key figure in the report, wherein the key figure defines a statistical calculation performed on the attribute.

11. The method of claim 1, wherein a data object of the plurality of data objects includes an attribute that triggers a second report.

12. The method of claim 1, wherein a data object of the plurality of data objects includes an attribute serving as a selector in the report.

13. The method of claim 1, wherein storing the transactional data comprises continuously storing the transactional data.

14. The method of claim 1, wherein storing the transactional data comprises storing the transactional data in a columnar format in the in-memory database.

15. The method of claim 1, wherein the network data structure is not a star schema in that the first and second data objects are linked by the relationship that is not a mere connection between a fact table and dimension tables as in the star schema.

16. The method of claim 1, wherein the network data structure includes a complex relationship, wherein the complex relationship includes information related to the forward navigation method and the reverse navigation method that are not symmetric.

17. The method of claim 1, wherein the in-memory database stores the transactional data in the volatile memory and not persistently in the hard drive.

18. The method of claim 1, wherein the forward navigation method has an input, has an output, and controls how the first object type is linked to the second object type, wherein the input is one or more keys of the first object type and the output is one or more keys of the second object type.

19. A computer program, embodied on a non-transitory recording medium, for controlling a computer system to relate data and generate reports, the computer program comprising:

an online analytical processing (OLAP) component that is configured to control an OLAP system that includes an in-memory database, wherein the in-memory database stores data in a volatile memory and not persistently on a hard drive, wherein the OLAP component is configured to control the OLAP system to store a network data structure that relates a plurality of data objects, wherein the network data structure includes a table having a plurality of columns, wherein the plurality of columns includes a first column for a first data object, a second column for a second data object, a third column for a relationship type that defines how underlying database tables for the first data object and the second data object are joined during runtime data extraction, a fourth column for a forward navigation method for navigating from the first data object to the second data object, and a fifth column for a reverse navigation method for navigating from the second data object to the first data object, and wherein the OLAP component is configured to control the OLAP system to store transactional data in the in-memory database in the OLAP system as stored transactional data; and a reporting component that is configured to control the OLAP system to generate a report using the stored transactional data according to the network data structure.

20. A system for controlling a computer system to relate data and to generate reports, comprising:

an online analytical processing (OLAP) server that implements an OLAP system including a processor and an in-memory database, wherein the in-memory database stores data in a volatile memory and not persistently on a hard drive, and wherein the OLAP server is configured to execute processing including:

storing a network data structure that relates a plurality of data objects, wherein the network data structure includes a table having a plurality of columns, wherein the plurality of columns includes a first column for a first data object, a second column for a second data object, a third column for a relationship type that defines how underlying database tables for the first data object and the second data object are joined during runtime data extraction, a fourth column for a forward navigation method for navigating from the first data object to the second data object, and a fifth column for a reverse navigation method for navigating from the second data object to the first data object, storing transactional data in the in-memory database as stored transactional data, and generating a report using the stored transactional data according to the network data structure.

\* \* \* \* \*